United States Patent
Nakaishi

(10) Patent No.: US 8,565,308 B2
(45) Date of Patent: Oct. 22, 2013

(54) INTERFRAME PREDICTION PROCESSOR WITH ADDRESS MANAGEMENT MECHANISM FOR MOTION VECTOR STORAGE

(75) Inventor: Hidenori Nakaishi, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1810 days.

(21) Appl. No.: 11/655,231

(22) Filed: Jan. 19, 2007

(65) Prior Publication Data

US 2008/0043842 A1 Feb. 21, 2008

(30) Foreign Application Priority Data

Aug. 17, 2006 (JP) .................................. 2006-222395

(51) Int. Cl.
*H04N 7/12* (2006.01)
*H04N 11/02* (2006.01)
*H04N 11/04* (2006.01)

(52) U.S. Cl.
USPC ............. 375/240.16; 375/240.12; 375/240.13

(58) Field of Classification Search
USPC ........................... 375/240.12, 240.13, 240.16
See application file for complete search history.

(56) References Cited

U.S. PATENT DOCUMENTS

| | | | | |
|---|---|---|---|---|
| 6,519,287 B1* | 2/2003 | Hawkins et al. | ......... | 375/240.16 |
| 6,542,542 B1* | 4/2003 | Nakano | .................... | 375/240.01 |
| 7,664,180 B2* | 2/2010 | Kondo et al. | ............. | 375/240.14 |
| 7,852,938 B2* | 12/2010 | Shi et al. | .................. | 375/240.16 |
| 7,965,773 B1* | 6/2011 | Schlanger et al. | ........ | 375/240.16 |
| 2003/0112872 A1* | 6/2003 | Park et al. | ................. | 375/240.16 |
| 2006/0045186 A1* | 3/2006 | Koto et al. | ............... | 375/240.16 |
| 2006/0126739 A1* | 6/2006 | Stoner | ....................... | 375/240.16 |

FOREIGN PATENT DOCUMENTS

| | | |
|---|---|---|
| JP | 11-243552 | 9/1999 |
| JP | 2000-50284 A | 2/2000 |
| JP | 2004-48552 | 2/2004 |
| JP | 2004-266731 | 9/2004 |
| JP | 2006-74474 A | 3/2006 |

* cited by examiner

*Primary Examiner* — Saleh Najjar
*Assistant Examiner* — Feliciano Mejia
(74) *Attorney, Agent, or Firm* — Arent Fox LLP

(57) ABSTRACT

A device for processing variable-size macroblocks to achieve high-speed interframe prediction. A predictor calculator determines a motion vector predictor (MVP) for a current macroblock from motion vectors of other macroblocks adjacent to the current macroblock. To achieve this, the predictor calculator specifies adjacent macroblocks to an address calculator. The address calculator calculates a vector memory address for each specified adjacent macroblock, based on the block size of that specified macroblock. The predictor calculator reads out motion vectors from the received addresses and determines MVP for the current macroblock.

6 Claims, 28 Drawing Sheets

FIG. 7A CALCULATING MOTION VECTOR OF 16x16 MACROBLOCK
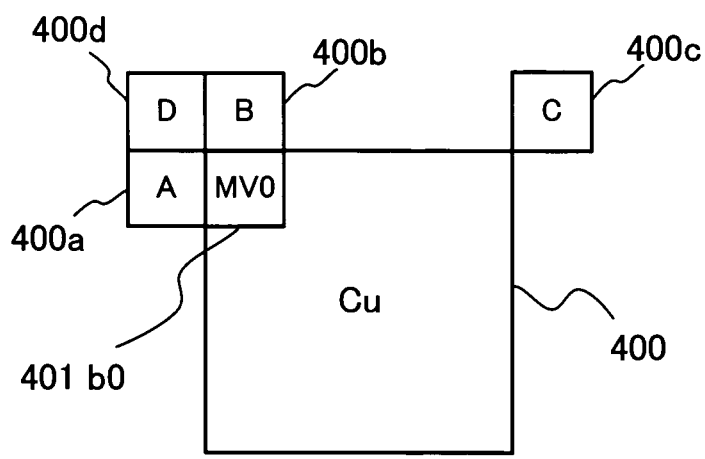
FIG. 7B WRITING MOTION VECTOR OF 16x16 MACROBLOCK
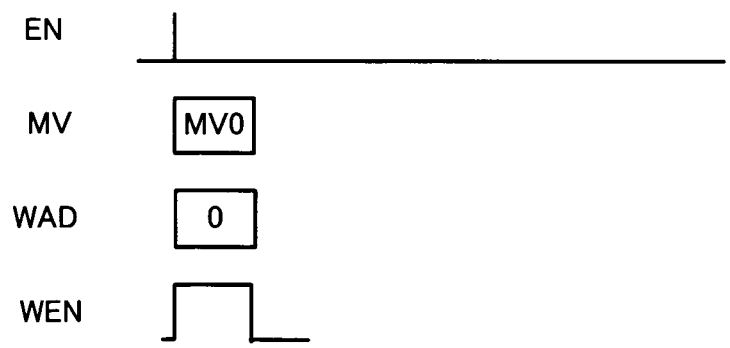

FIG. 8A  CALCULATING MOTION VECTORS OF 16x8 MACROBLOCKS
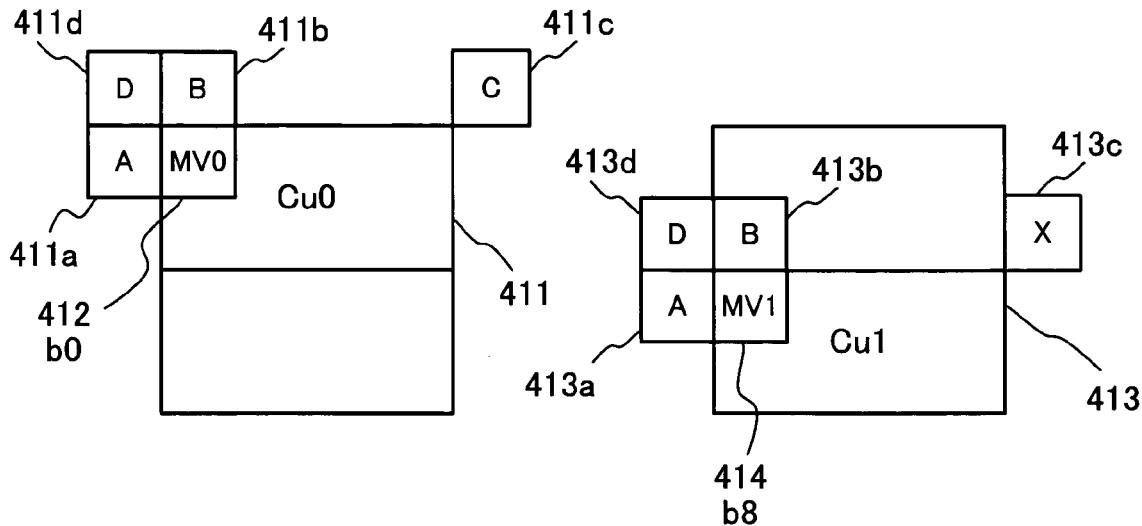
FIG. 8B  WRITING MOTION VECTORS OF 16x8 MACROBLOCKS
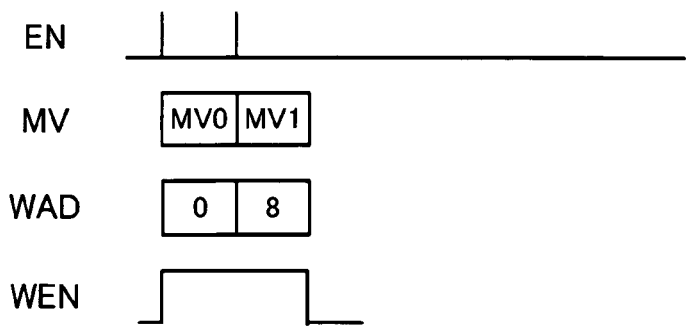

FIG. 9A  CALCULATING MOTION VECTORS OF 8x16 MACROBLOCKS
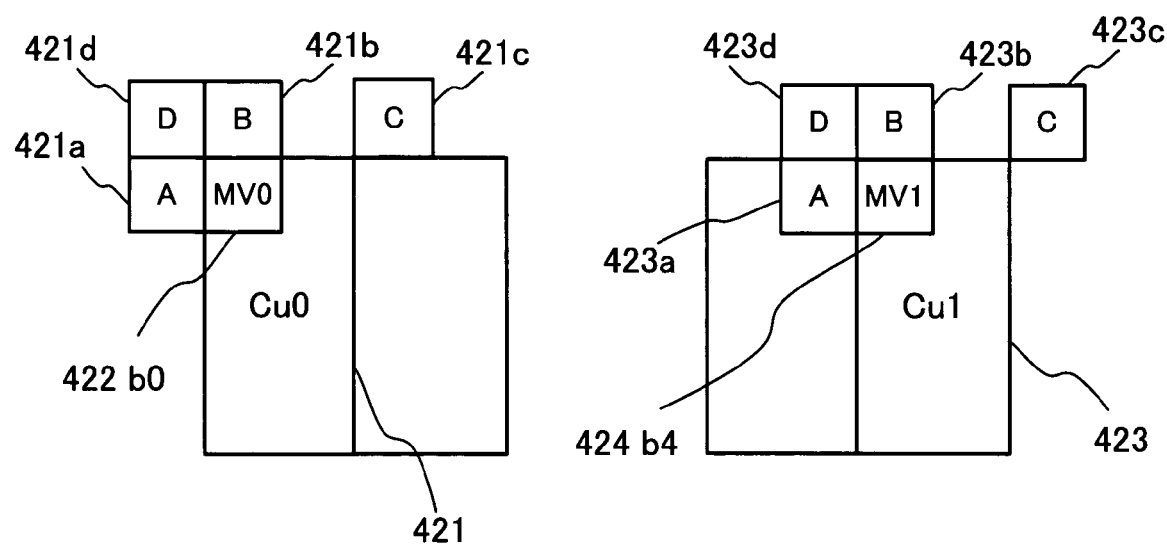
FIG. 9B  WRITING MOTION VECTORS OF 8x16 MACROBLOCKS
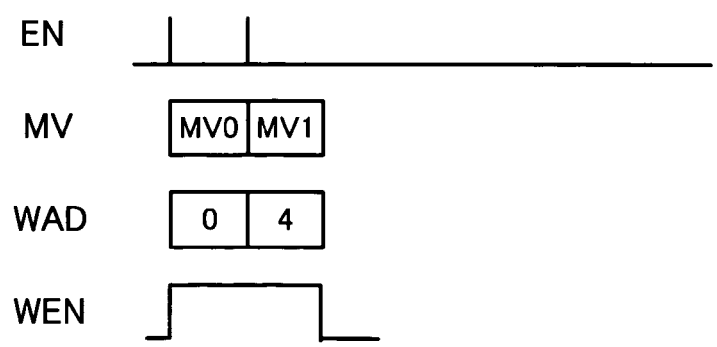

FIG. 10A  CALCULATING MOTION VECTORS OF 8x8 MACROBLOCKS
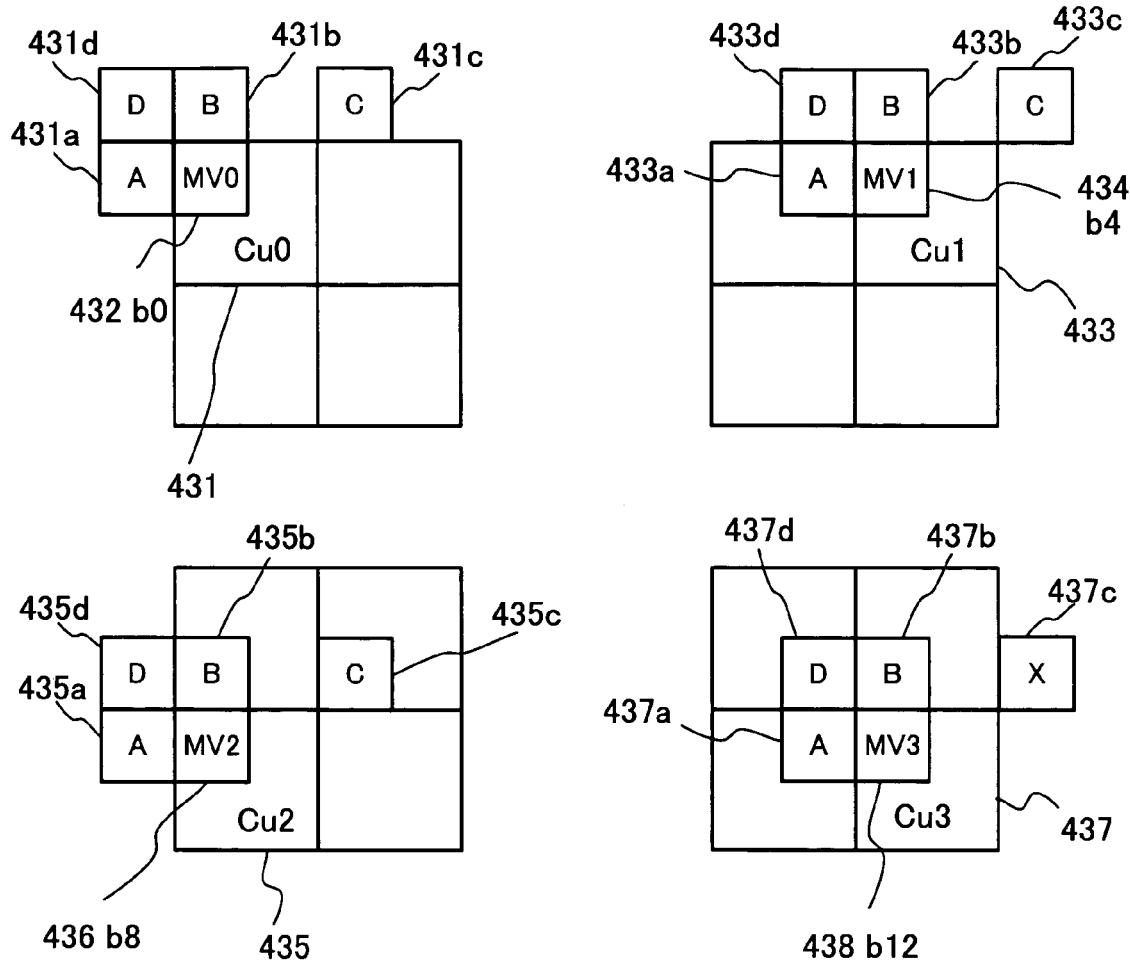
FIG. 10B  WRITING MOTION VECTORS OF 8x8 MACROBLOCKS
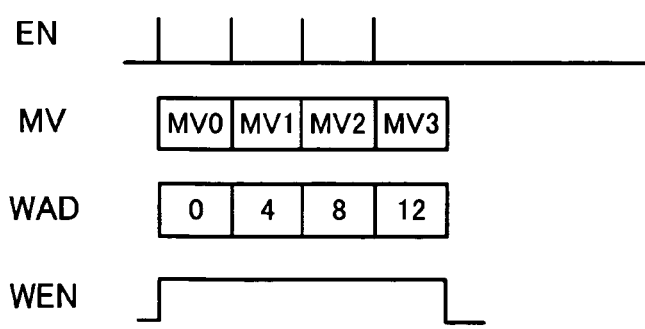

FIG. 11A  MACROBLOCK SUB-PARTITIONING
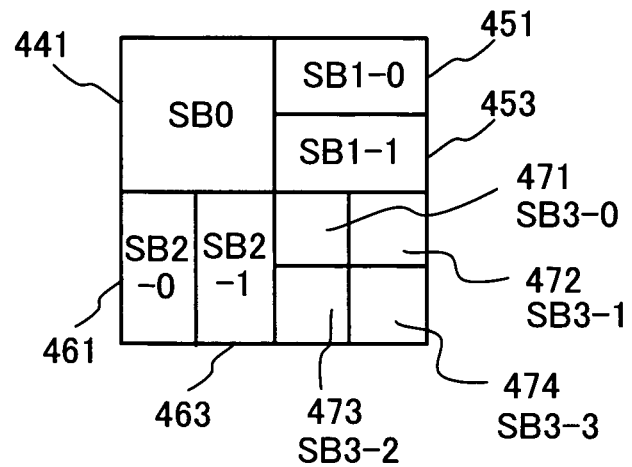
FIG. 11B  MOTION VECTORS OF SUB-MACROBLOCKS
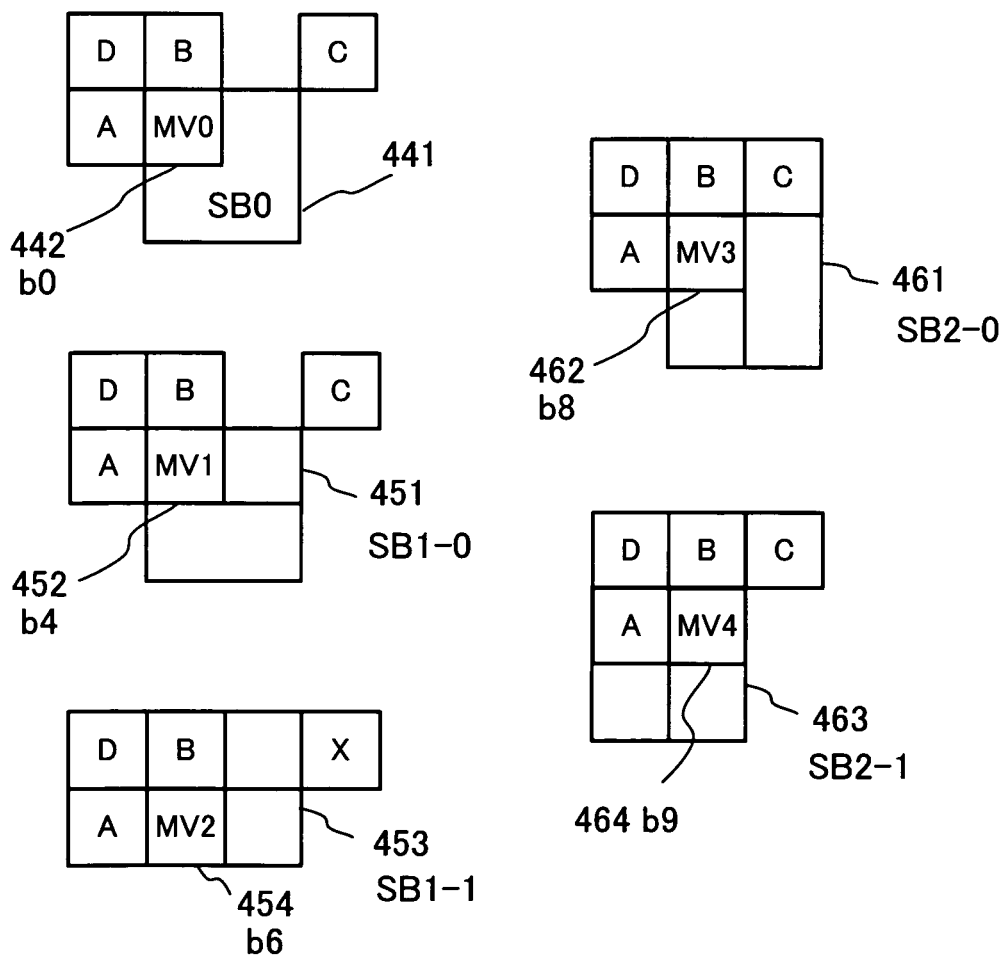

FIG. 12A  MOTION VECTORS OF SUB-MACROBLOCKS (continued)
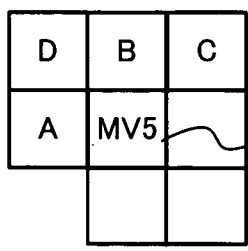
471
SB3-0
(b12)
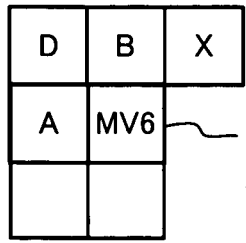
472
SB3-1
(b13)
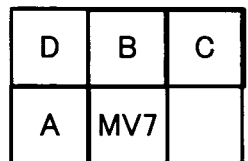
473
SB3-2
(b14)
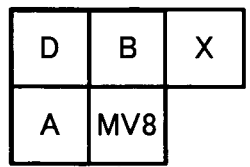
474
SB3-3
(b15)
FIG. 12B  WRITING MOTION VECTORS OF SUB-MACROBLOCKS
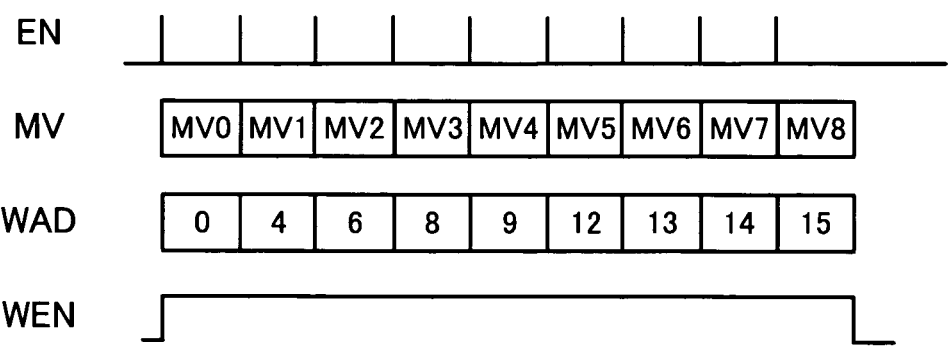

| BLOCK SIZE | SPECIFIED MACROBLOCK LOCATION | TRANSLATED LOCATION |
|---|---|---|
| 8X16 MACROBLOCK 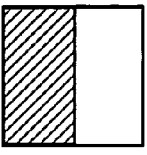 |  b0　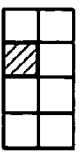 b2　 b8　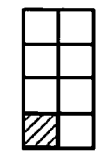 b10<br> b1　 b3　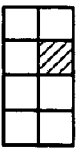 b9　 b11 |  b0 |
| 8X8 MACROBLOCK 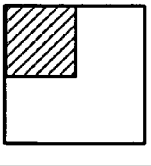 | 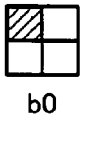 b0　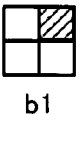 b1　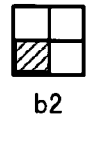 b2　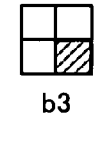 b3 | 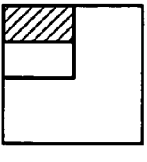 b0 |
| 8X4 SUB-MACROBLOCK 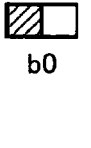 | 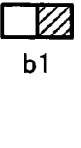 b0　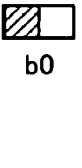 b1 | 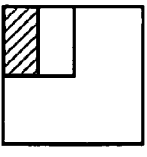 b0 |
| 4X8 SUB-MACROBLOCK 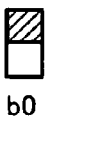 |  b0　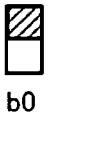 b2 | 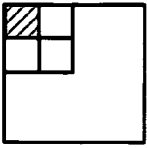 b0 |
| 4X4 SUB-MACROBLOCK 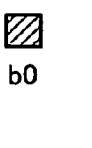 | 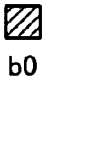 b0 |  b0 |
FIG. 14

FIG. 15    MB-A VECTOR STORAGE MANAGEMENT
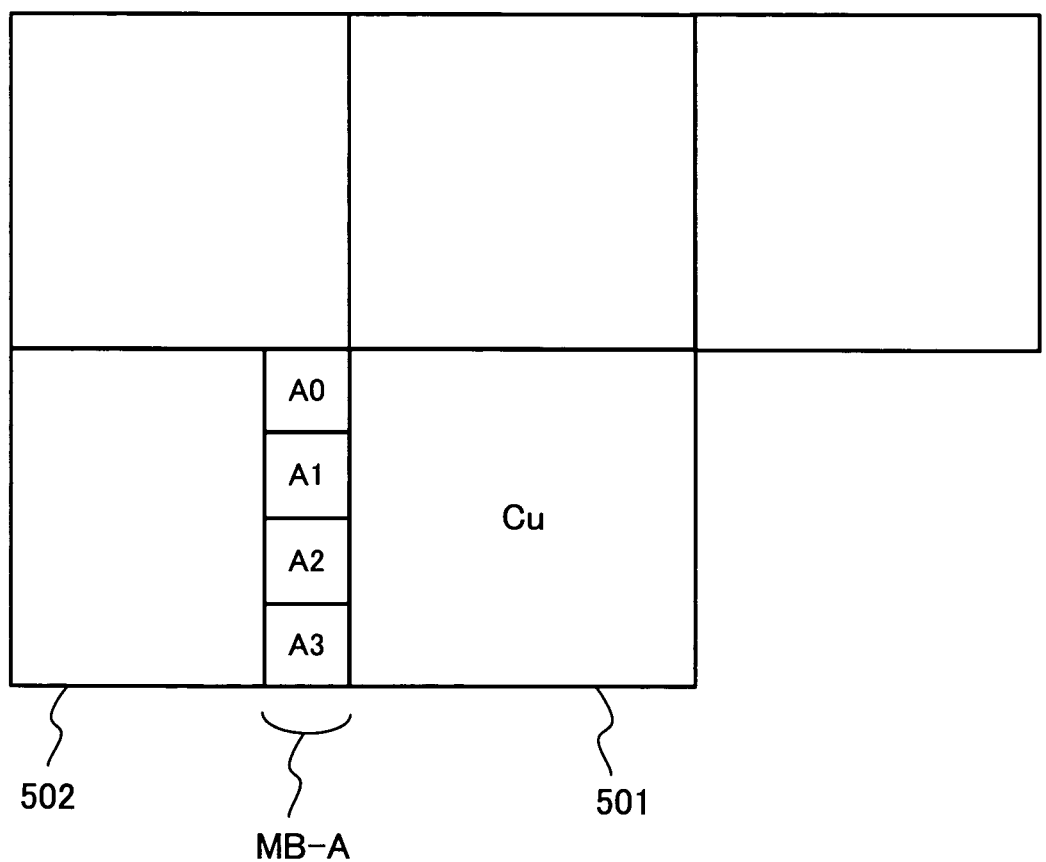

FIG. 16  MB-BCD VECTOR STORAGE MANAGEMENT
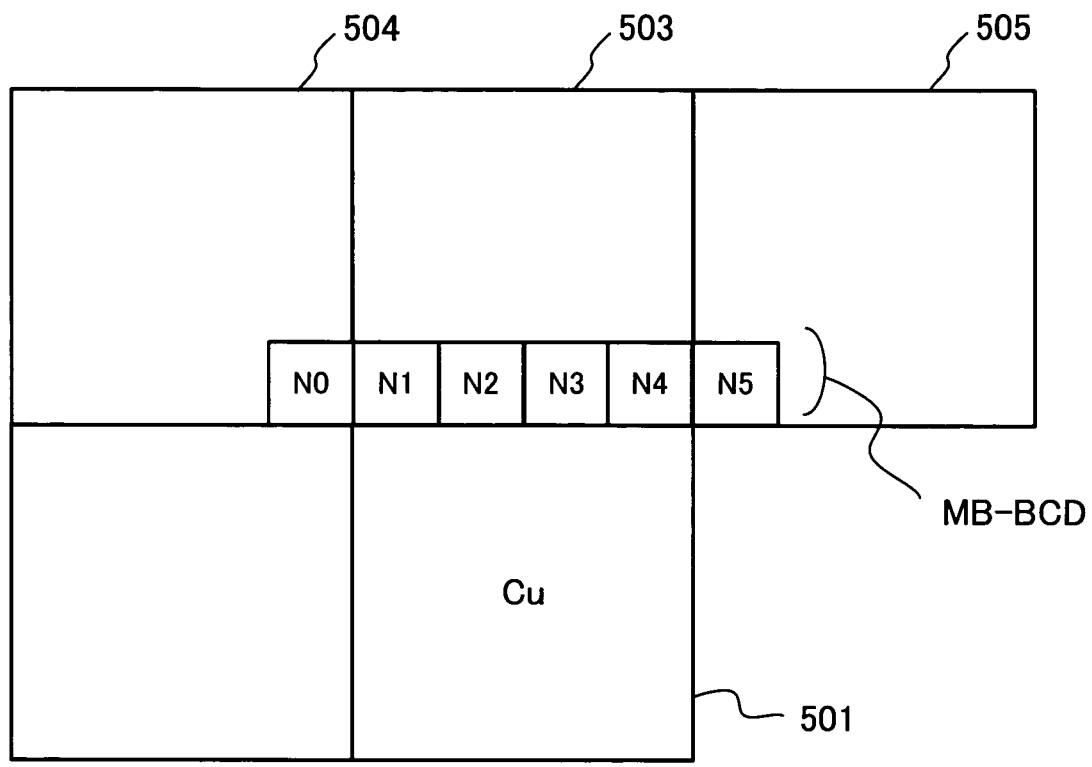

FIG. 17A REPRESENTATIVE VECTOR STORAGE LOCATIONS FOR ADJACENT 16X16 MACROBLOCKS
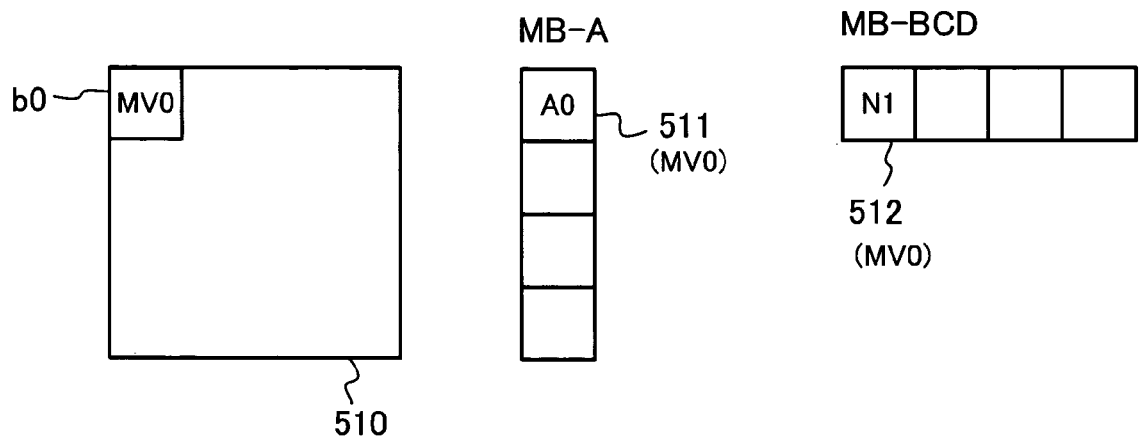
FIG. 17B REPRESENTATIVE VECTOR STORAGE LOCATIONS FOR ADJACENT 16X8 MACROBLOCKS
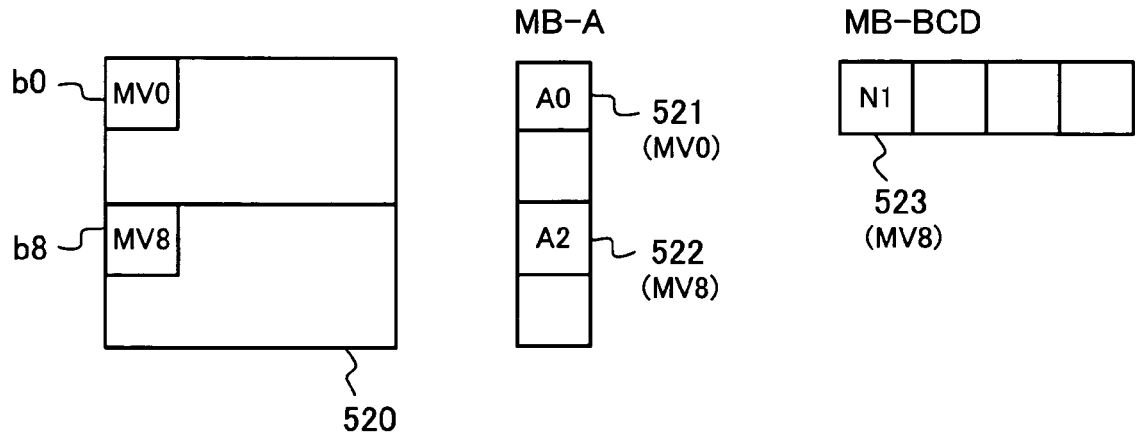

FIG. 18A  REPRESENTATIVE VECTOR STORAGE LOCATIONS FOR ADJACENT 8X16 MACROBLOCKS
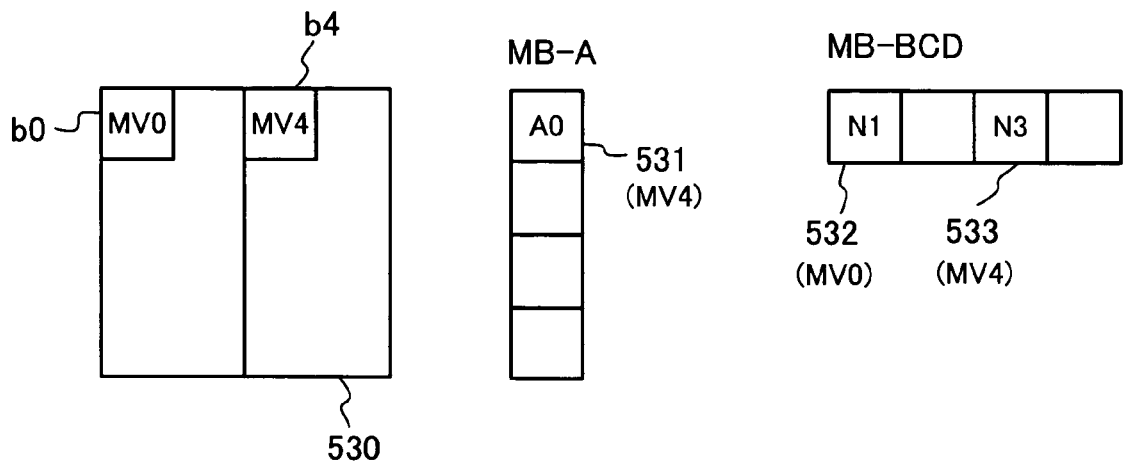
FIG. 18B  REPRESENTATIVE VECTOR STORAGE LOCATIONS FOR ADJACENT 8X8 MACROBLOCKS
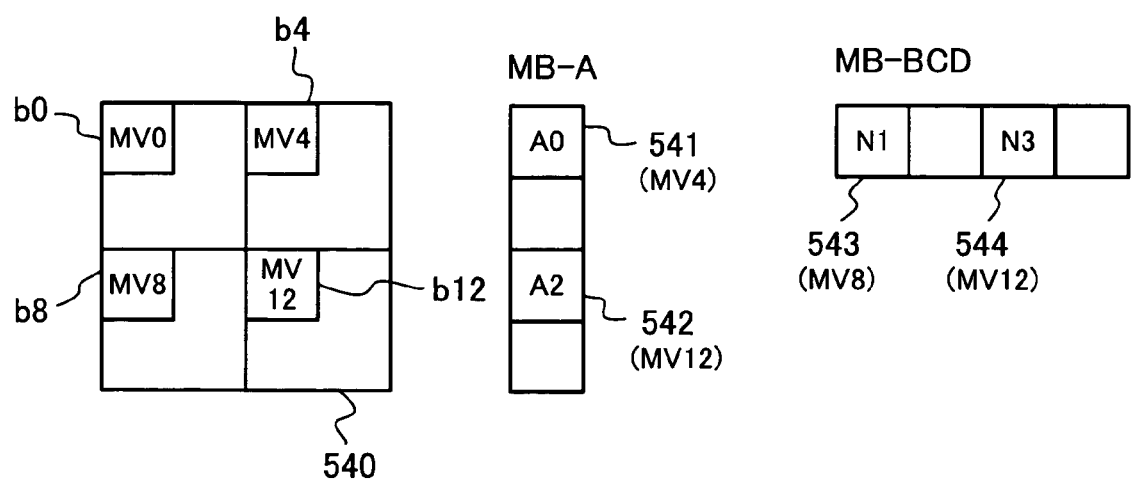

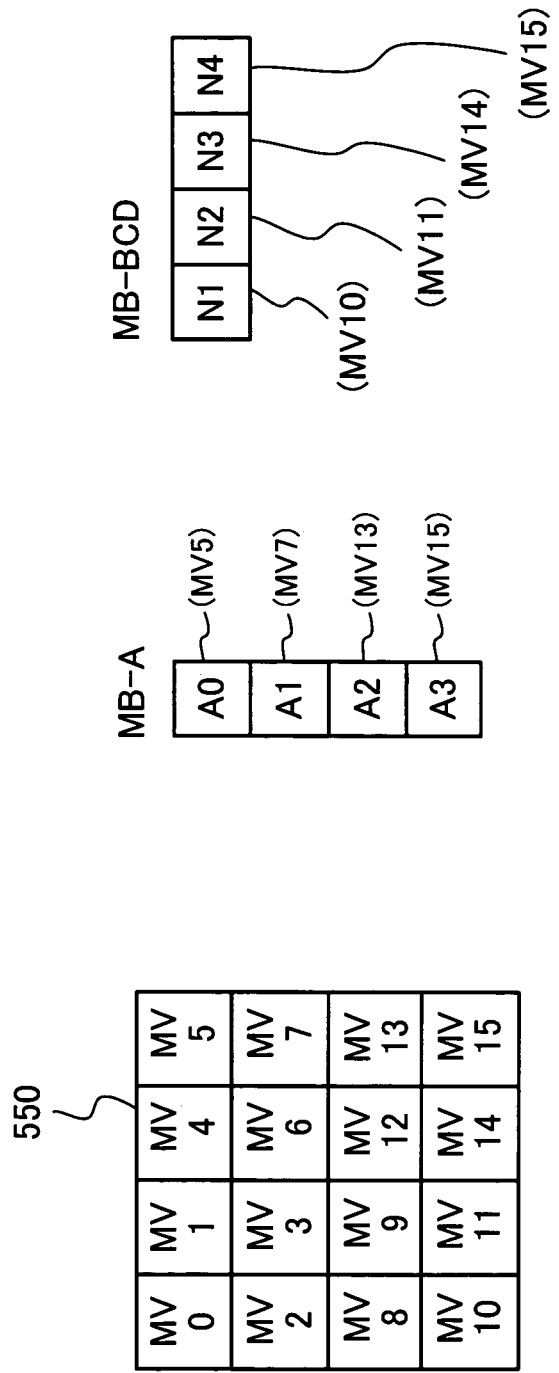
FIG. 19  REPRESENTATIVE VECTOR STORAGE LOCATIONS FOR ADJACENT 4X4 SUB-MACROBLOCKS

| BLOCK SIZE | REPRESENTATIVE VECTOR | SPECIFIED MB-A LOCATION | TRANSLATED LOCATION |
|---|---|---|---|
| 16X16 MACROBLOCK | (MV0) A0 | A0 A1 A2 A3 | (MV0) A0 |
| 16X8 MACROBLOCK | (MV0) (MV8) A0,A2 | A0 A1 | (MV0) A0 |
| | | A2 A3 | (MV8) A2 |
| 8X16 MACROBLOCK | (MV4) A0 | A0 A1 A2 A3 | (MV4) A0 |
| 8X8 MACROBLOCK | (MV4) (MV12) A0,A2 | A0 A1 | (MV4) A0 |
| | | A2 A3 | (MV12) A2 |

FIG. 20

| BLOCK SIZE | REPRESENTATIVE VECTOR | SPECIFIED MB-A LOCATION | TRANSLATED LOCATION |
|---|---|---|---|
| 8X4 MACROBLOCK | (MV4) (MV6) (MV12) (MV14) A0,A1,A2,A3 | A0 | A0 (MV4) |
| | | A1 | A1 (MV6) |
| | | A2 | A2 (MV12) |
| | | A3 | A3 (MV14) |
| 4X8 MACROBLOCK | (MV5) (MV13) A0,A2 | A0 A1 | A0 (MV5) |
| | | A2 A3 | A2 (MV13) |
| 4X4 MACROBLOCK | (MV5) (MV7) (MV13) (MV15) A0,A1,A2,A3 | A0 | A0 (MV5) |
| | | A1 | A1 (MV7) |
| | | A2 | A2 (MV13) |
| | | A3 | A3 (MV15) |

FIG. 21

| BLOCK SIZE | REPRESENTATIVE VECTOR | SPECIFIED MB-BCD LOCATION | TRANSLATED LOCATION |
|---|---|---|---|
| 16X16 MACROBLOCK | N1 (MV0) | N1N2N3N4 | N1 (MV0) |
| 16X8 MACROBLOCK | N1 (MV8) | N1N2N3N4 | N1 (MV8) |
| 8X16 MACROBLOCK | N1 N3 (MV0) (MV4) | N1N2 | N1 (MV0) |
|  |  | N3N4 | N3 (MV4) |
| 8X8 MACROBLOCK | N1 N3 (MV8) (MV12) | N1N2 | N1 (MV8) |
|  |  | N3N4 | N3 (MV12) |

FIG. 22

| BLOCK SIZE | REPRESENTATIVE VECTOR | SPECIFIED MB-BCD LOCATION | TRANSLATED LOCATION |
|---|---|---|---|
| 8X4 MACROBLOCK | N1 N3 (MV8) (MV12) | N1,N2 | N1 (MV8) |
| | | N3,N4 | N3 (MV12) |
| 4X8 MACROBLOCK | N1 N2 N3 N4 (MV8) (MV9) (MV12) (MV13) | N1 | N1 (MV8) |
| | | N2 | N2 (MV9) |
| | | N3 | N3 (MV12) |
| | | N4 | N4 (MV13) |
| 4X4 MACROBLOCK | N1 N2 N3 N4 (MV10) (MV11) (MV14) (MV15) | N1 | N1 (MV10) |
| | | N2 | N2 (MV11) |
| | | N3 | N3 (MV14) |
| | | N4 | N4 (MV15) |

FIG. 23

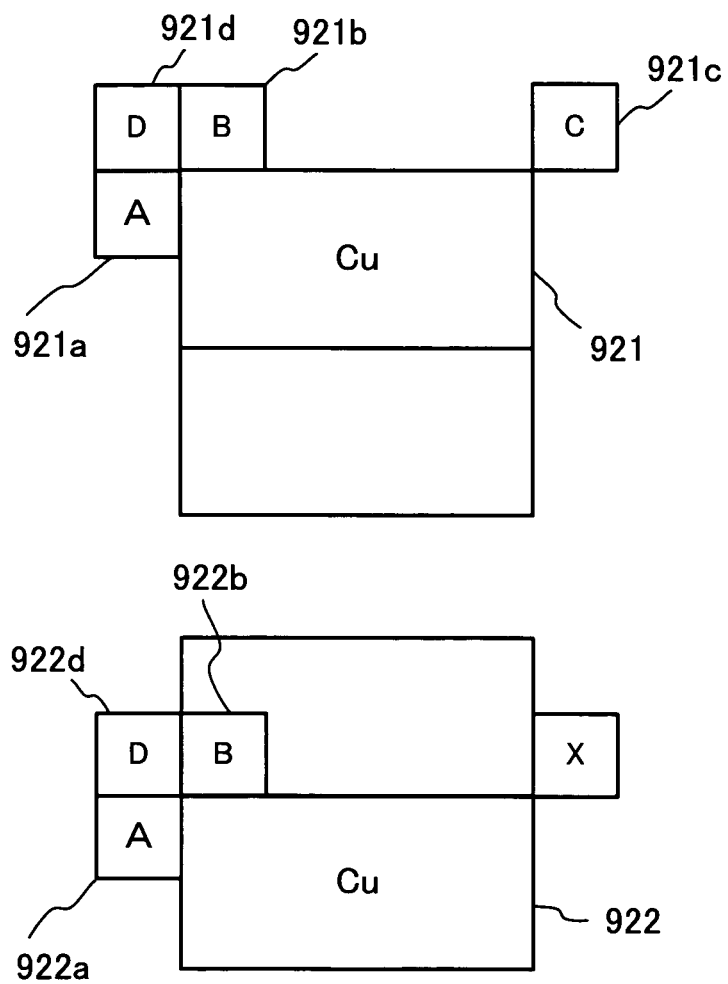
FIG. 27  MACROBLOCKS ADJACENT TO 16X8 MACROBLOCK

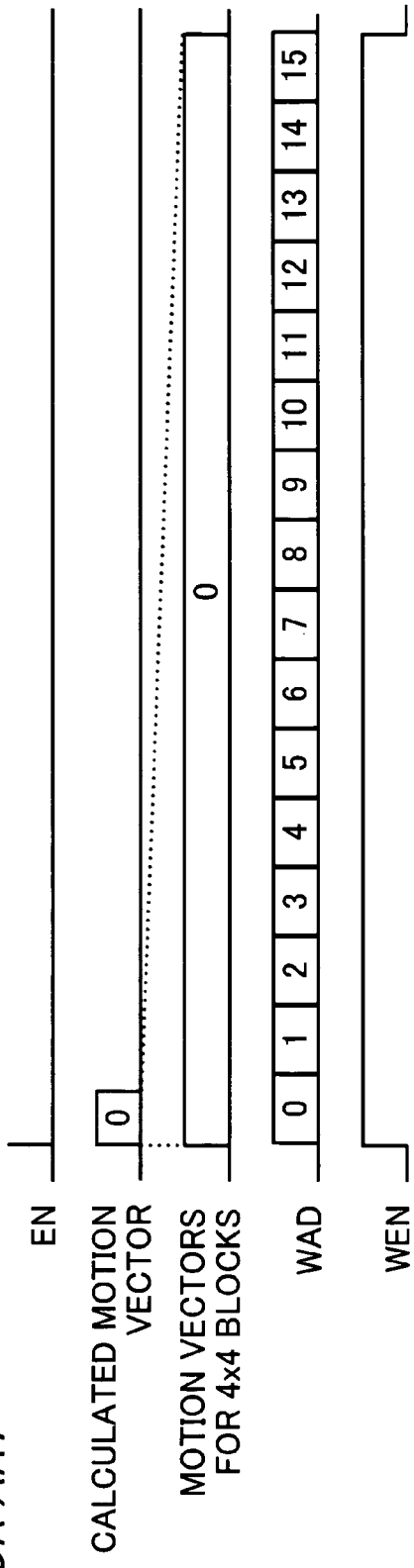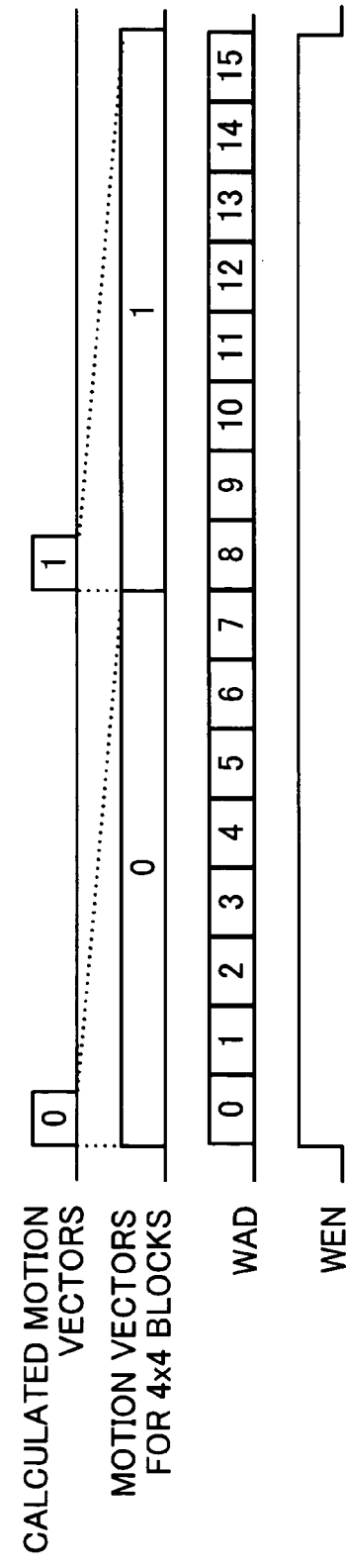

INTERFRAME PREDICTION PROCESSOR WITH ADDRESS MANAGEMENT MECHANISM FOR MOTION VECTOR STORAGE

CROSS-REFERENCE TO RELATED APPLICATIONS

This application is based upon and claims the benefits of priority from the prior Japanese Patent Application No. 2006-222395 filed on Aug. 17, 2006, the entire contents of which are incorporated herein by reference.

BACKGROUND OF THE INVENTION

1. Field of the Invention

The present invention relates to a device and method for predicting frames from other frames, as well as to video coding and decoding devices using the same. More particularly, the present invention relates to an interframe prediction processor and a method therefor, a video coding device, and a video decoding device that performs interframe prediction of video frames on the basis of variable-size blocks.

2. Description of the Related Art

Digital video compression techniques are widely used in many applications. MPEG and H.264 are among the standard specifications in this technical field, where MPEG stands for "Moving Picture Expert Group." The coding and decoding algorithms used in those standards divide each given picture into small areas and process them with motion compensation techniques. Such areas are called "macroblocks." A video coding process involves intraframe prediction and interframe prediction. The intraframe prediction reduces redundancy within a single frame by using orthogonal transform, quantization, and other data processing algorithms. The interframe prediction, on the other hand, reduces redundancy between successive frames by encoding motion compensation residual (i.e., the difference between a current frame and a motion-compensated reference frame). The resulting video data is then entropy-coded for transmission or storage. A video decoding process reverses the above steps to reconstruct original video from compressed video.

Most part of such a video coding algorithm is devoted to calculation of motion vectors for interframe prediction. It is therefore desired to develop a faster and more efficient method of motion vector calculation. One method is proposed in, for example, Japanese Unexamined Patent Application Publication No. 2004-266731. The proposed video coding method alleviates the memory capacity requirement of reference pictures by selectively storing a limited number of reference macroblocks that have been determined to be used in the next motion-compensated inter-coded frame.

To improve the accuracy of motion vector prediction for macroblocks containing edges and outlines, some existing coding algorithms split up such macroblocks into smaller blocks and calculate a motion vector for each block. For example, H.264 supports macroblock partitioning that divides a basic macroblock of 16×16 pixels into various block sizes as necessary, including sub-partitions of 4×4 pixels.

FIG. 24 shows the block sizes defined in H.264, where the arrows indicate the order of processing. Shown in the topmost part of FIG. 24 is a basic macroblock 91 with a size of 16×16 pixels. Where appropriate in this specification, the size of a block is designated as a prefix representing width by height (as in "16×16 macroblock 91"). The 16×16 basic macroblock 91 may be vertically partitioned into two 16×8 macroblocks 92, or horizontally partitioned into two 8×16 macroblocks 93, or partitioned in both ways into four 8×8 macroblocks 94. The 16×8 macroblocks 92 are processed from top to bottom. The 8×16 macroblocks 93 are processed from left to right. The 8×8 macroblocks 94 are processed from top-left to top-right, then bottom-left to bottom-right.

H.264 further allows an 8×8 macroblock 94 to be divided into smaller partitions called "sub-macroblocks." The above-noted size prefix can also be applied to those sub-macroblocks. In the example shown in FIG. 24, the top-left 8×8 macroblock 94 is divided into two 8×4 sub-macroblocks 95a, the top-right 8×8 macroblock 94 is divided into two 4×8 sub-macroblocks 95b, and the bottom-right 8×8 macroblock 94 is divided into four 4×4 sub-macroblocks 95c. Sub-macroblocks are supposed to be processed in the same order as in the macroblock partitions described above.

As can be seen from the above, the video coding device is allowed to use smaller blocks for motion compensation in order to keep better track of faster and/or finer motions of objects in a video. The use of this technique, however, results in an increased amount of coded data of motion vectors. Several researchers have therefore proposed a video coding device that can reduce the memory bandwidth required to produce virtual samples by determining dynamically the accuracy of virtual samples according to the size of macroblocks used in motion vector prediction. See for example, Japanese Unexamined Patent Application Publication No. 2004-48552. One drawback of this existing interframe prediction technique is that the reference picture data has to be formulated in accordance with the smallest block size so that it can handle various sizes of macroblocks.

A video coding device calculates a motion vector (abbreviated as "MV" where appropriate) corresponding to each individual macroblock and then determines a motion vector predictor (abbreviated as "MVP" where appropriate) for a current macroblock from calculated motion vectors of its surrounding macroblocks. The video coding device then encodes motion vector differences (abbreviated as "MVD" where appropriate) between MVs and MVPs and outputs them, together with macroblock information, as a coded video data stream. This video stream is received by a video decoding device. The video decoding device decodes the coded MVDs and macroblock information and calculates motion vectors from MVDs and MVPs, where MVP of a macroblock can be determined from motion vectors of surrounding blocks that have already decoded. Using those motion vectors, the video decoding device reconstructs the original video stream.

More specifically, the video decoding device produces motion vectors in the following way. FIG. 25 is a block diagram of a motion vector calculator in a conventional video decoding device. This video decoding device has a memory 901, an MVP calculation controller 902, a motion vector calculation controller 903, a 4×4 block storage processor 904, an MB-A vector storage manager 905, and an MB-BCD vector storage manager 906. The symbol "MB-A" refers to an adjacent macroblock A, and "MB-BCD" refers to adjacent macroblocks B, C, and D (described later). The memory 901 provides vector storage locations to store motion vectors corresponding to minimum-size blocks (i.e., 4×4 sub-macroblock) for later reference. Those vector storage locations are used to store motion vectors of the currently processed macroblock, as well as motion vectors that have been calculated for macroblocks adjacent to the current macroblock.

In operation, the illustrated video decoding device begins producing motion vectors upon receipt of the following pieces of information: macroblock size, sub-macroblock size, and decoded MVDs. The MVP calculation controller 902 reads out motion vectors of macroblocks adjacent to the current macroblock. Based on those motion vectors, the MVP calculation controller 902 produces an MVP of the current macroblock. Here the MVP calculation controller 902 specifies which adjacent blocks to read, on a minimum block size basis. The motion vector calculation controller 903 then reproduces a motion vector from the calculated MVP and decoded MVD. The 4×4 block storage processor 904 duplicates the reproduced motion vector over the vector storage locations reserved for the current macroblock, for each block of 4×4 pixels (i.e., the minimum block size). The memory 901 also provides vector storage locations to store calculated motion vectors of adjacent macroblocks, which are reserved on a minimum block size basis, similarly to the ones for the current macroblock. The MB-A and MB-BCD vector storage manager 905 and 906 fill those vector storage locations with motion vectors of adjacent macroblocks, assuming the 4×4 minimum block size.

FIG. 26 shows a 16×16 macroblock 910 and its adjacent macroblocks, where motion vectors are expanded. The currently processed macroblock is referred to by the symbol "Cu," and its surrounding macroblocks are referred to as "MB-A" (immediately left), "MB-B" (immediately above), "MB-C" (diagonally above the top-right corner), and "MB-D" (diagonally above the top-left corner). When reading reference motion vectors, the MVP calculation controller 902 specifies these adjacent macroblocks on a minimum block basis.

In the example of FIG. 26, the current focus is on a 16×16 macroblock 910. Then its adjacent macroblock MB-A is a 4×4 sub-macroblock 911, the topmost of the four sub-macroblocks at the left of the current macroblock 910. Likewise, MB-B is a 4×4 sub-macroblock 912, the leftmost of the four sub-macroblocks immediately above the current macroblock 910. MB-C is a 4×4 sub-macroblock 913 located diagonally above the top-right corner of the current macroblock 910. MB-D is a 4×4 sub-macroblock 914 located diagonally above the top-left corner of the current macroblock 910. MVP of the current macroblock 910 is determined from the motion vectors calculated for those sub-macroblocks, and the motion vector MV0 for the current macroblock 910 is then calculated from the determined MVP and given MVD. The 4×4 block storage processor 904 saves the calculated motion vector MV0 in a plurality of vector storage locations 910-1 corresponding to the current macroblock 910.

As described above, a plurality of vector storage locations 910-1 are reserved in the memory 901 to accommodate as many motion vectors as the number of minimum-size blocks. More specifically, sixteen vector storage locations are prepared assuming that a macroblock with a size of 16×16 pixels is partitioned into 4×4-pixel minimum-size blocks. The 4×4 block storage processor 904 stores MV0 into all the sixteen vector storage locations. (Note that FIG. 26 only shows logical relationships between vector storage locations and macroblocks, rather than a physical arrangement of memory areas.)

The configuration shown in FIG. 26 associates the calculated motion vector MV0 with every sub-macroblock constituting the current macroblock 910. When the focus moves to the next macroblock, the macroblock 910 will then be referenced as an adjacent macroblock with respect to the new current macroblock. For example, the top-right sub-macroblock of the macroblock 910 is now referenced as MB-A of the new current macroblock. The logical configuration of FIG. 26 permits the motion vector of this MB-A to be read out of the corresponding vector storage location 911-1. Likewise, the bottom-left sub-macroblock of the macroblock 910 may be referenced as MB-B or MB-C in later processing, in which case the motion vectors of MB-B and MB-C can be retrieved from the vector storage location 912-1 in the memory 901. The bottom-right sub-macroblock of the macroblock 910 may be referenced as MB-D, in which case its motion vector is available at the vector storage location 914-1.

FIG. 27 shows macroblocks adjacent to a 16×8 macroblock. The illustrated 16×8 macroblocks 921 and 922 are upper and lower partitions of a 16×16 basic macroblock. Suppose that the current focus is on the upper 16×8 macroblock 921. A motion vector of this macroblock is then calculated with reference to existing motion vectors of four adjacent macroblocks MB-A 921a, MB-B 921b, MB-C 921c, and MB-D 921d. When the focus moves to the lower 16×8 macroblock 922, its motion vector is calculated with reference to another set of existing motion vectors at adjacent macroblocks MB-A 922a, MB-B 922b, and MB-D 922d. Notice that the motion vector corresponding to the adjacent macroblock MB-B 922b has previously been calculated as a motion vector for the upper 16×8 macroblock 921.

As can be seen from the above example, the conventional method saves multiple copies of a previously calculated motion vector in vector storage locations corresponding to 4×4 sub-macroblocks. Those stored motion vectors can be used later to calculate a motion vector of another macroblock.

FIGS. 28A and 28B show how a motion vector is duplicated in multiple vector storage locations. Specifically, FIG. 28A shows a sequence of writing a motion vector of a 16×16 macroblock, and FIG. 28B shows a sequence of writing a motion vector of a 16×8 macroblock.

In the case of 16×16 macroblocks, one motion vector MV0 is produced for one basic macroblock, and this motion vector MV0 is written in sixteen vector storage locations. As seen in the example of FIG. 28A, the write sequence is triggered by a rising edge of a write enable signal (EN) to write the same motion vector MV0 while increasing the write address (WAD) from 0 to 15. This operation allows a subsequent motion vector calculation process to retrieve the same MV0 from any of those sixteen addresses.

In the case of 16×8 macroblocks, two motion vectors MV0 and MV1 are calculated each for upper and lower halves of a 16×16 basic macroblock. MV0 is written in vector storage locations corresponding to the upper 16×8 macroblock 921 (FIG. 27), while MV1 is written in those corresponding to the lower 16×8 macroblock 922 (FIG. 27). As FIG. 28B shows, the vector write sequence triggered by a rising edge of EN begins writing MV0 into first eight vector storage locations by increasing WAD from 0 to 7. Another series of eight memory cycles follow this, writing MV1 to second eight vector storage locations by increasing WAD from 8 to 15. As a result, MV0 can be retrieved from the vector storage locations corresponding to the upper 16×8 macroblock 921 by specifying an address in the range of 0 to 7. Also, MV1 can be retrieved from the vector storage locations corresponding to the lower 16×8 macroblock 922 by specifying an address in the range of 8 to 15.

Since multiple copies of a previously calculated motion vector are stored in vector storage locations corresponding to a 16×16 macroblock, the subsequent processing for other macroblocks can reach that reference motion vector at any of those vector storage locations. However, it takes time to write motion vectors repetitively all over the vector storage locations corresponding to a 16×16 macroblock. This is also true for macroblocks of other sizes and shapes.

Referring back to FIG. 25, the MB-A vector storage manager 905 stores data of an adjacent macroblock MB-A in storage locations reserved as part of the memory 901, for use in subsequent processes. It is necessary to duplicate data also in this case, assuming the partitioning of macroblocks into 4×4 sub-macroblocks. This assumption results in an increased processing time of motion vector calculation.

The interframe coding of H.264 allows the use of a plurality of reference frames in both forward and backward directions to improve the accuracy of prediction. This feature necessitates a larger number of vector storage locations. The video coding and decoding devices will have to process a larger number macroblocks as the screen size, or the number of pixels, increases. Thus the task of duplicating motion vectors in multiple locations would be more and more time-consuming. It is therefore needed to develop a new technique to accelerate the MVP calculation so that video frames with a large picture size can be predicted with a high accuracy.

SUMMARY OF THE INVENTION

In view of the foregoing, it is an object of the present invention to provide a device and method for processing variable-size macroblocks to achieve high-speed interframe prediction. It is also an object of the present invention to provide a video coding device and a video decoding device employing the proposed interframe prediction device.

To accomplish the first object stated above, the present invention provides an interframe prediction processor that performs interframe prediction of video frames on a block basis. This interframe prediction processor includes the following elements: (a) a reference picture memory providing vector storage locations corresponding to minimum size blocks to store motion vectors calculated for blocks of variable sizes; (b) an address calculator that calculates an address of a vector storage location in the reference picture memory, based at least on the size of a specified block; (c) a predictor calculator that specifies blocks adjacent to a current block to the address calculator so as to obtain therefrom addresses of motion vectors calculated for the adjacent blocks specified, reads out the motion vectors from the obtained addresses of the reference picture memory, and determines a motion vector predictor of the current block based on the motion vectors read out of the reference picture memory; and (d) a reference picture storage manager that writes calculated motion vectors in the vector storage locations reserved in the reference picture memory.

Also, to accomplish the second object stated above, the present invention provides a video coding device that encodes video frames into compressed video data by performing motion-compensated prediction between a source picture and a reference picture on a block basis. This video coding device includes the following elements: (a) a reference picture memory providing vector storage locations corresponding to minimum size blocks to store motion vectors calculated for blocks of variable sizes; (b) an address calculator that calculates an address of a vector storage location in the reference picture memory, based at least on the size of a specified block; (c) a predictor calculator that specifies blocks adjacent to a current block to the address calculator so as to obtain therefrom addresses of motion vectors calculated for the adjacent blocks specified, reads out the motion vectors from the obtained addresses of the reference picture memory, determines a motion vector predictor of the current block based on the motion vectors read out of the reference picture memory; and (d) a reference picture storage manager that writes calculated motion vectors in the vector storage locations reserved in the reference picture memory.

Further, to accomplish the second object stated above, the present invention provides a video decoding device that reconstructs original video frames from a compressed video signal that has been produced by performing motion-compensated interframe prediction on a block basis. This video decoding device includes the following elements: (a) a reference picture memory providing vector storage locations corresponding to minimum size blocks to store motion vectors calculated for blocks of variable sizes; (b) an address calculator that calculates an address of a vector storage location in the reference picture memory, based at least on the size of a specified block; (c) a predictor calculator that specifies blocks adjacent to a current block to the address calculator so as to obtain therefrom addresses of motion vectors calculated for the adjacent blocks specified, reads out the motion vectors from the obtained addresses of the reference picture memory, determines a motion vector predictor of the current block based on the motion vectors read out of the reference picture memory, and reconstructs a motion vector of the current block from the determined motion vector predictor and a decoded motion vector difference; and (d) a reference picture storage manager that writes the reconstructed motion vectors in the vector storage locations reserved in the reference picture memory.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 7A and 7B show how the present embodiment calculates and saves motion vectors in the case of 16×16 macroblocks.

FIGS. 8A and 8B show how the present embodiment calculates and saves motion vectors in the case of 16×8 macroblocks.

FIGS. 9A and 9B show how the present embodiment calculates and saves motion vectors in the case of 8×16 macroblocks.

FIGS. 10A and 10B show how the present embodiment calculates and saves motion vectors in the case of 8×8 macroblocks.

FIGS. 11A and 11B show how the present embodiment partitions a macroblock into sub-macroblocks and how it produces representative motion vectors for them.

FIG. 12A is another diagram showing how the present embodiment produces motion vectors of sub-macroblocks.

FIG. 12B shows how the present embodiment saves representative motion vectors in memory.

FIG. 14 shows how an address translation table is used to make reference to 8×16 macroblocks, 8×8 macroblocks, 8×4 sub-macroblocks, 4×8 sub-macroblocks, and 4×4 sub-macroblocks.

FIG. 15 shows how the present embodiment saves motion vectors of adjacent macroblocks in MB-A vector storage locations.

FIG. 16 shows how the present embodiment saves motion vectors of an adjacent macroblock in MB-BCD vector storage locations.

FIGS. 17A and 17B show representative vector storage locations for adjacent 16×16 macroblocks and 16×8 macroblocks according to the present embodiment.

FIGS. 18A and 18B show representative vector storage locations for adjacent 8×16 macroblocks and 8×8 macroblocks according to the present embodiment.

FIG. 19 shows representative vector storage locations for adjacent 4×4 sub-macroblocks according to the present embodiment.

FIGS. 20 and 21 show how an address translation table is used to make reference to MB-A vector storage locations.

FIGS. 22 and 23 show how an address translation table is used to make reference to MB-BCD vector storage locations.

FIG. 27 shows macroblocks adjacent to 16×8 macroblocks.

FIGS. 28A and 28B show a process of duplicating a motion vector in multiple storage locations.

DESCRIPTION OF THE PREFERRED EMBODIMENTS

Figure 1:
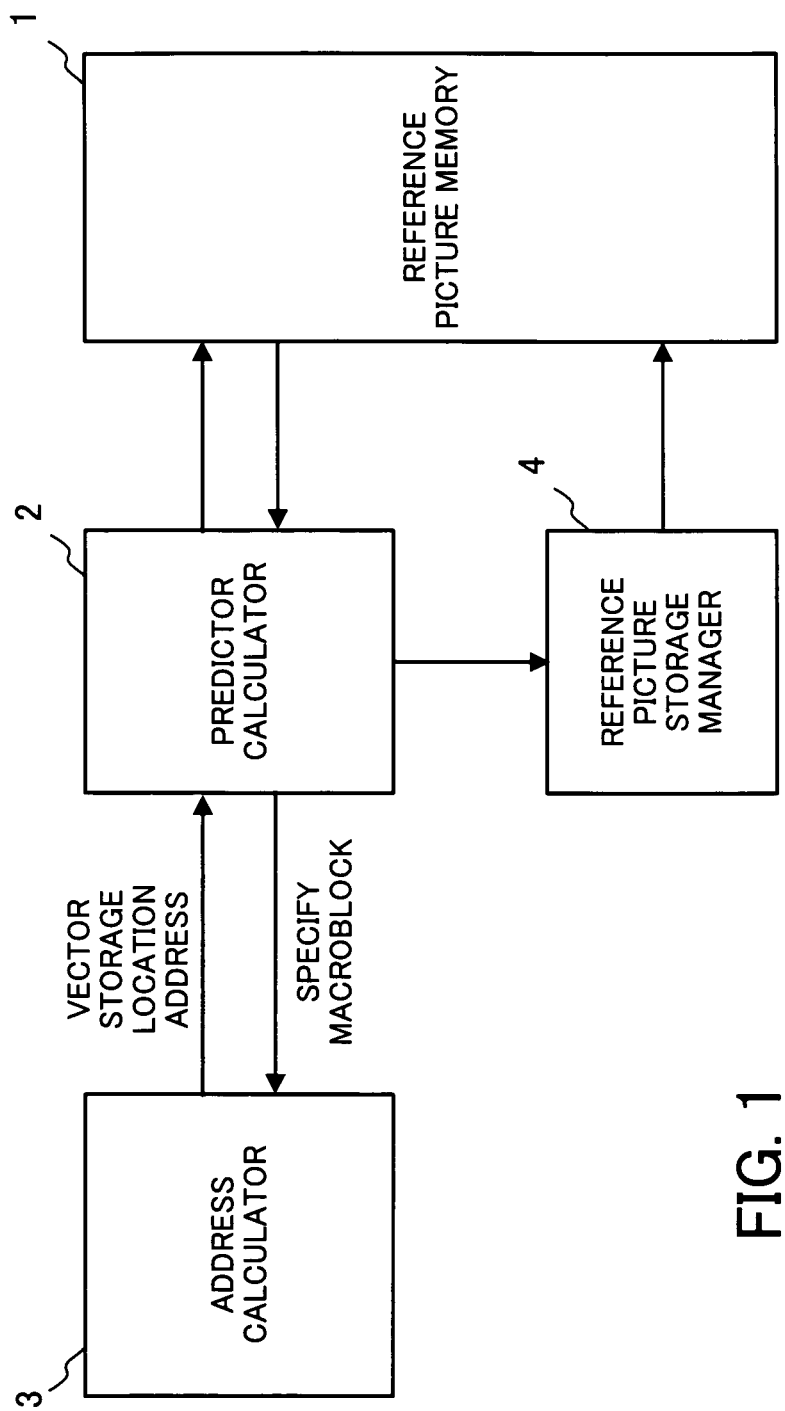
FIG. 1 shows the concept of an interframe prediction processor in which the present invention is embodied.

Preferred embodiments of the present invention will be described below with reference to the accompanying drawings, wherein like reference numerals refer to like elements throughout. The description begins with an overview of the present invention and then proceeds to a more specific embodiment of the invention. In the rest of this document, the size and shape of a macroblock (and its partitions) is indicated by a prefix representing its width and height. For example, the term "16×8 macroblock" denotes that the macroblock is 16 pixels wide by 8 pixels high. While the present embodiment deals with various block sizes, the full size macroblocks of 16×16 pixels are referred to as "basic macroblocks." Also note that the term "macroblock" (or simply "block") is used in this specification to mean a basic unit of digital image for motion compensation. Macroblocks in this sense refer to 16×16 basic macroblocks, as well as macroblock partitions and macroblock sub-partitions (or sub-macroblocks) with prescribed sizes explained in an earlier section, unless such distinction is necessary.

FIG. 1 shows the concept of an interframe prediction processor in which the present invention is embodied. This embodiment is intended for use in a video coding device and a video decoding device which process a video data stream by dividing each given picture frame into small areas, called macroblocks, with appropriate sizes for the purpose of motion vector prediction. The block size, i.e., the area size of a macroblock, is selected from among several prescribed sizes, depending on the magnitude of image motion or the required resolution of objects. The present description does not discuss details of how the block size is determined since some existing technical documents offer them.

The interframe prediction processor is supposed to calculate a motion vector predictor (MVP) of a specific macroblock with reference to motion vectors (MVs) of surrounding blocks. To this end, the proposed interframe prediction processor includes the following elements: a reference picture memory 1, a predictor calculator 2, an address calculator 3, and a reference picture storage manager 4.

The reference picture memory 1 stores motion vectors of macroblocks including those adjacent to a currently processed macroblock which may be referenced when calculating MVP of that current macroblock. The reference picture memory 1 provides at least two sets of reserved vector storage locations. One set is for storing motion vectors of macroblocks included in a basic macroblock that is currently processed. Another set is for storing motion vectors of referenced macroblocks adjacent to the current macroblock. Each set of vector storage locations can accommodate the maximum number of motion vectors, which is determined from the minimum size of partitions of a basic macroblock. In the case of H.264, for example, one 16×16 basic macroblock may be divided into sixteen 4×4 sub-macroblocks. Assuming this minimum size of partitions, the reference picture memory 1 provides sixteen vector storage locations for each 16×16 basic macroblock. The motion vector calculated for a variable-size macroblock will be stored in one of those sixteen vector storage locations corresponding to one basic macroblock. That is, when the currently processed macroblock is a 16×16 basic macroblock, for example, its motion vector is entered not to all sixteen vector storage locations, but to one vector storage location selected from among the sixteen locations. An appropriate selection is made according to a prescribed rule, uniquely for each different shape of macroblocks. The selected vector storage location will be referred to hereinafter as the "representative vector storage location," and the motion vector stored in that location will be referred to as the "representative vector."

The predictor calculator 2 specifies particular adjacent macroblocks to the address calculator 3 to obtain memory addresses of their corresponding representative vector storage locations in the reference picture memory 1. The obtained memory addresses are used to read out desired motion vectors from the reference picture memory 1. Based on those motion vectors, the predictor calculator 2 calculates MVP of the current block. In the case of video coding, motion vector differences (MVD) between such MVPs and MVs are calculated and compressed for delivery to decoder devices. In the case of video decoding, the predictor calculator 2 reproduces a motion vector from the calculated MVP and decoded MVD. The reproduced motion vectors are used to reconstruct video pictures.

When an address request specifying an adjacent macroblock is received from the predictor calculator 2, the address calculator 3 determines the memory address of its corresponding representative vector in the reference picture memory 1, based on the block size of the specified adjacent macroblock. Motion vectors calculated for preceding macroblocks are available in the representative vector storage locations corresponding to those macroblocks. Since the representative vector storage location corresponding to a specific macroblock can be determined uniquely from the block size of that macroblock, the address calculator 3 first looks into the given address request to figure out the size of the specified macroblock. The address calculator 3 calculates a memory address from the block size and passes it back to the predictor calculator 2. As will be described in detail later, the address calculator 3 may be designed to use a translation table that associates memory address values of representative vector storage locations with different block sizes.

The reference picture storage manager 4 stores representative vectors in appropriate vector storage locations for reference to calculate motion vectors for the next and subsequent macroblocks. Adjacent macroblock vector storage locations have been reserved in the reference picture memory 1 to store motion vectors used to calculate MVP of other macroblocks.

In operation, the predictor calculator 2 successively selects macroblocks of a given source picture in a predetermined order to calculate a motion vector for each macroblock. The reference picture memory 1 stores representative motion vectors that have been calculated for preceding macroblocks in previously reserved representative vector storage locations. In order to calculate MVP of the currently selected macroblock, the predictor calculator 2 needs the memory address of each representative vector storage location corresponding to adjacent macroblocks surrounding the current macroblock. The predictor calculator 2 thus sends an address request to the address calculator 3, specifying those adjacent macroblocks in question. The address calculator 3 calculates a memory address for each specified adjacent macroblock, based on the block size of that macroblock. With the memory addresses received from the address calculator 3, the predictor calculator 2 retrieves relevant motion vectors from the reference picture memory 1, thus producing MVP. In the video coding applications, MVP is used to calculate a motion vector difference MVD to be encoded. In the video decoding applications, MVP is used to reconstruct motion vectors from decoded MVDs. The reference picture storage manager 4 saves the calculated motion vector of the current macroblock in one of the vector storage locations, so that the vector can be referenced later as a motion vector of an adjacent macroblock.

As can be seen from the above, the proposed interframe prediction processor employs an address calculator 3 to provide the address of representative vector storage locations storing motion vectors calculated earlier. The address calculator 3 eliminates the need for duplicating a calculated motion vector in multiple storage locations in the reference picture memory 1 to allow for the use of the minimum block size. The present embodiment thus reduces the processing time of motion vector calculation.

H.264 Video Coding Device

This and next sections will discuss H.264 video coding and decoding devices as a more specific embodiment of the present invention. As mentioned earlier, the H.264 standard offers the following options for macroblock size: 16×16, 16×8, 8×16, and 8×8. If the 8×8 mode is chosen, each of the four 8×8 macroblock partitions may be split into smaller blocks with the following sizes: 8×8, 8×4, 4×8, and 4×4 (known as macroblock sub-partitions). The baseline coding algorithm encodes each given source frame on a macroblock basis, switching between the intraframe coding utilizing spatial redundancy within a frame and the interframe coding utilizing temporal redundancy between successive frames. The decoding algorithm follows this process backward.

While H.264 allows bidirectional motion prediction, the following description assumes forward prediction for simplicity purposes. The present invention, however, should not be limited to the forward prediction. One skilled in the art would appreciate that the present invention can also be applied to bidirectional prediction by adding some memory areas to store motion vectors for both past and future reference frames.

Figure 2:
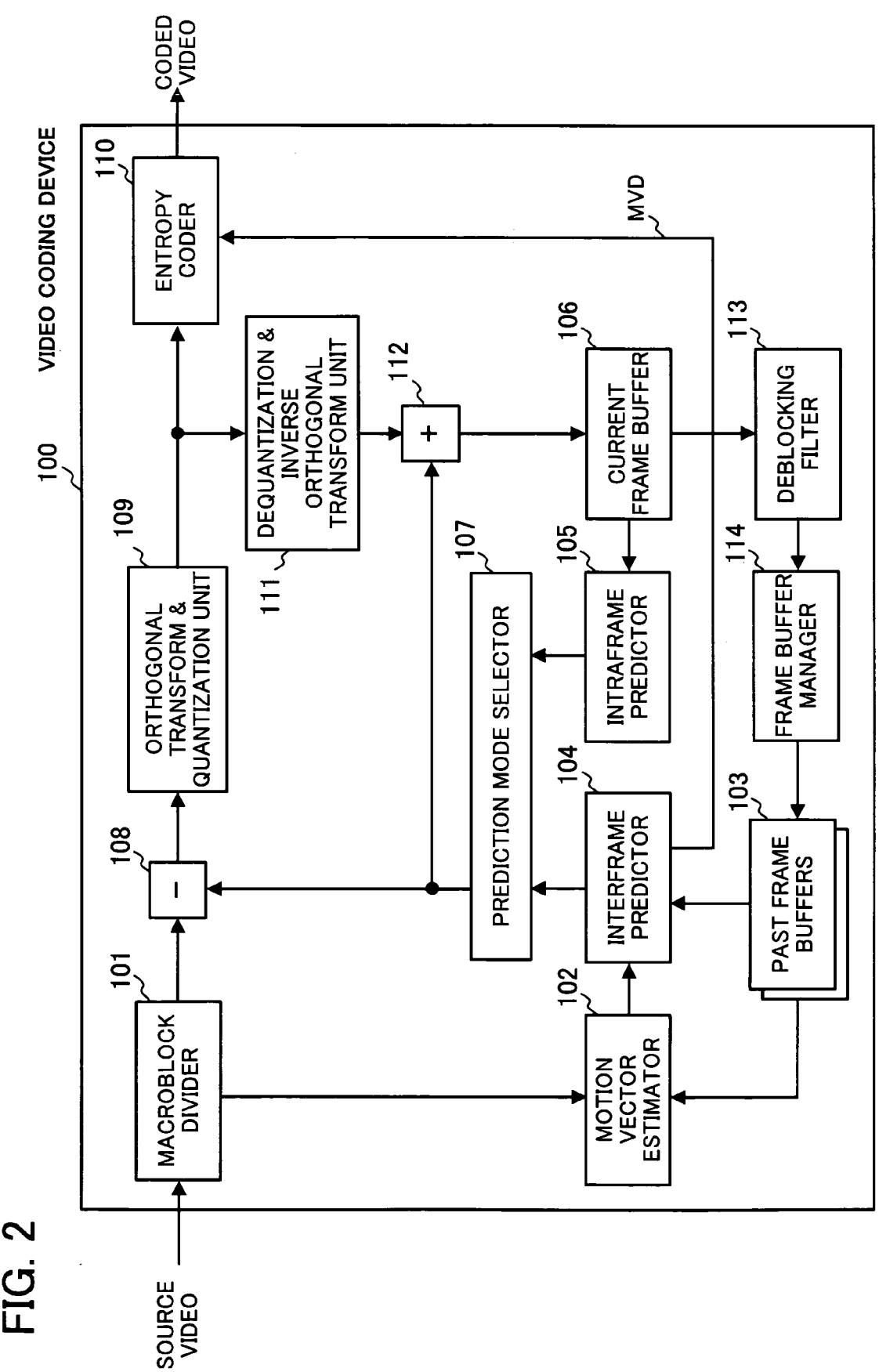
FIG. 2 is a block diagram of a video coding device according to an embodiment of the present invention.

FIG. 2 is a block diagram of a video coding device according to an embodiment of the present invention. The illustrated video coding device 100 includes the following elements: a macroblock divider 101, a motion vector estimator 102, past frame buffers 103, an interframe predictor 104, an intraframe predictor 105, a current frame buffer 106, a prediction mode selector 107, a subtractor 108, an orthogonal transform & quantization unit 109, an entropy coder 110, a dequantization & inverse orthogonal transform unit 111, an adder 112, a deblocking filter 113, and a frame buffer manager 114.

The macroblock divider 101 divides a given source picture into macroblocks of a predetermined size. The motion vector estimator 102 compares video signal components of a source macroblock with those of reference macroblocks stored in the past frame buffer 103, thereby calculating a motion vector for that source macroblock. Since motion vectors for neighboring blocks are often highly correlated, the motion vector of a certain block can be predicted from vectors of the surrounding blocks. The interframe predictor 104 thus calculates a motion vector predictor MVP from surrounding motion vectors and then calculates a motion vector difference MVD by subtracting MVP from the true motion vector. The intraframe predictor 105, on the other hand, performs intraframe coding of a frame stored in the current frame buffer 106.

The prediction mode selector 107 selects a coding mode that maximizes the efficiency of coding of the current macroblock by, for example, comparing prediction error of the interframe predictor 104 with that of the intraframe predictor 105. The prediction mode selector 107 creates coding mode parameters to indicate the selection result. The coding mode parameters are passed to the entropy coder 110 as part of data to be entropy-coded. The coding mode parameters include the size of macroblock partitions and the size of sub-macroblock partitions.

When the intraframe mode is selected, the divided source macroblocks are supplied as is from the macroblock divider 101 to the orthogonal transform & quantization unit 109. Those macroblocks are orthogonal-transformed and quantized, and the resulting transform coefficients are passed to the entropy coder 110 for entropy-coding and transmission. The transform coefficients are also decoded by the dequantization & inverse orthogonal transform unit 111 and sent into the current frame buffer 106.

When the interframe mode is selected, the interframe predictor 104 supplies the entropy coder 110 with MVD for entropy coding. In addition, a picture predicted with MVP is given to the subtractor 108 through the prediction mode selector 107. The subtractor 108 subtracts the predicted picture from the source picture on a macroblock basis and sends the result to the orthogonal transform & quantization unit 109. The quantized output data is decoded locally by the dequantization & inverse orthogonal transform unit 111 and directed to the adder 112, where the prediction picture supplied through the prediction mode selector 107 is added. The resulting picture is written into the current frame buffer 106. The entropy coder 110 encodes given data using the entropy coding algorithm, thus outputting a coded video signal carrying video data in compressed form. The reference picture stored in the current frame buffer 106 is subjected to the deblocking filter 113, where the boundary regions between macroblocks are smoothed out. The resulting picture is entered to the past frame buffer 103 through the frame buffer manager 114.

H.264 Video Decoding Device

Figure 3:
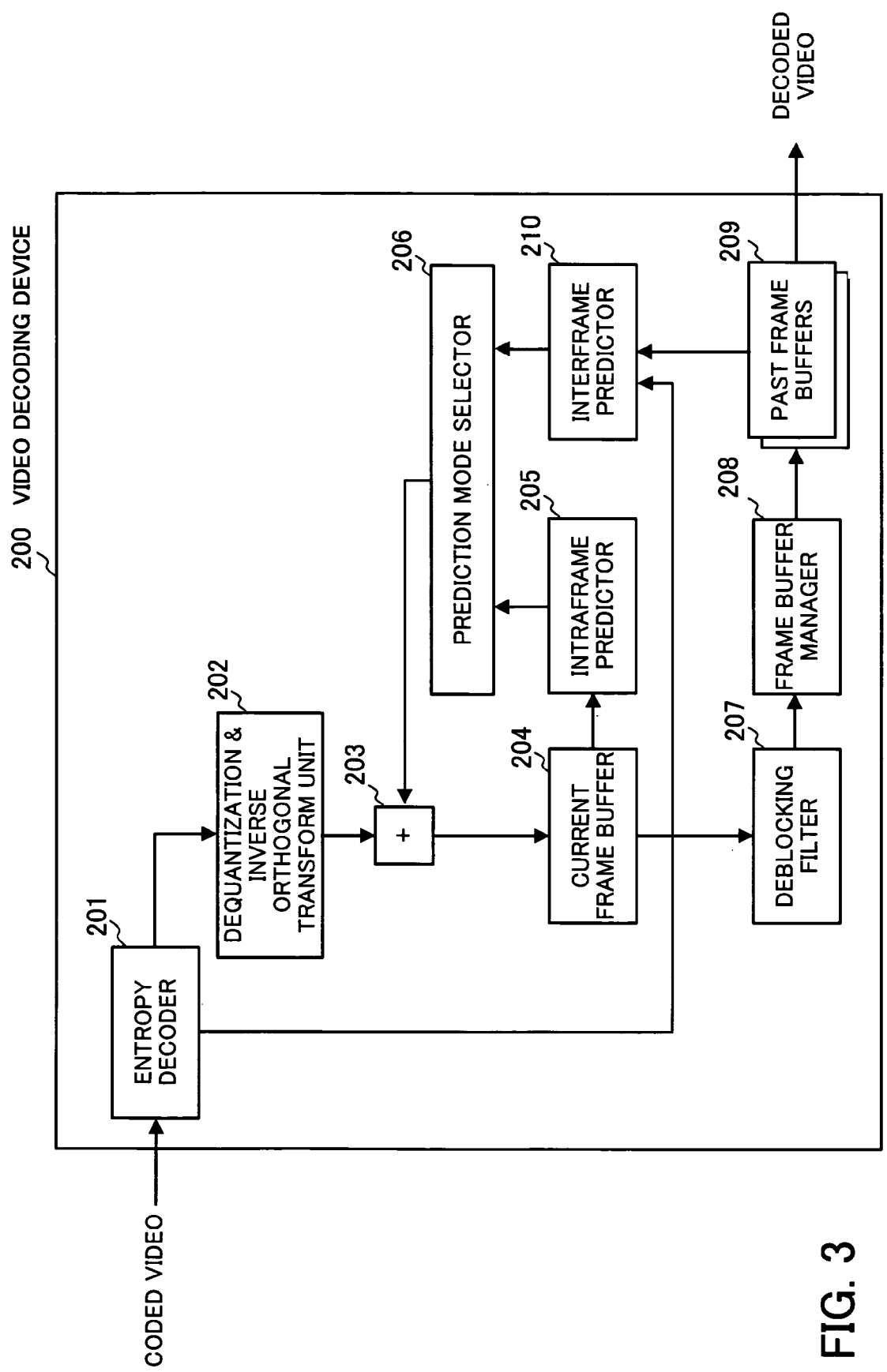
FIG. 3 is a block diagram of a video decoding device according to an embodiment of the present invention.

FIG. 3 is a block diagram of a video decoding device according to an embodiment of the present invention. The illustrated video decoding device 200 is formed from the following elements: an entropy decoder 201, a dequantization & inverse orthogonal transform unit 202, an adder 203, a current frame buffer 204, an intraframe predictor 205, a prediction mode selector 206, a deblocking filter 207, a frame buffer manager 208, past frame buffers 209, and an interframe predictor 210. With those elements, the video decoding device 200 decodes a coded video signal produced by the video coding device 100 of FIG. 2.

The given coded video signal is entropy-decoded by the entropy decoder 201 and then dequantized and back-transformed by the dequantization & inverse orthogonal transform unit 202. The outcomes of this decoding process include, among others, motion vector data in the form of MVD and coding mode parameters. Based on the coding mode parameters, the prediction mode selector 206 selects either the intraframe predictor 205 or the interframe predictor 210.

When the intraframe predictor 205 is selected, the picture frame reconstructed by the dequantization & inverse orthogonal transform unit 202 is routed to the current frame buffer 204. When the prediction mode selector 206 is selected, the motion vector differences MVDs are decoded back to the original motion vectors that the video coding device 100 produced for individual macroblocks. With the resulting motion vectors, the interframe predictor 210 reproduces and supplies a prediction picture to the adder 203 through the prediction mode selector 206. The prediction error decoded at the dequantization & inverse orthogonal transform unit 202 is then added to this prediction picture. The resulting decoded picture is entered to the current frame buffer 204. This picture data in the current frame buffer 204 is transferred to one of the past frame buffers 209 through the deblocking filter 207 and frame buffer manager 208.

Figure 4:
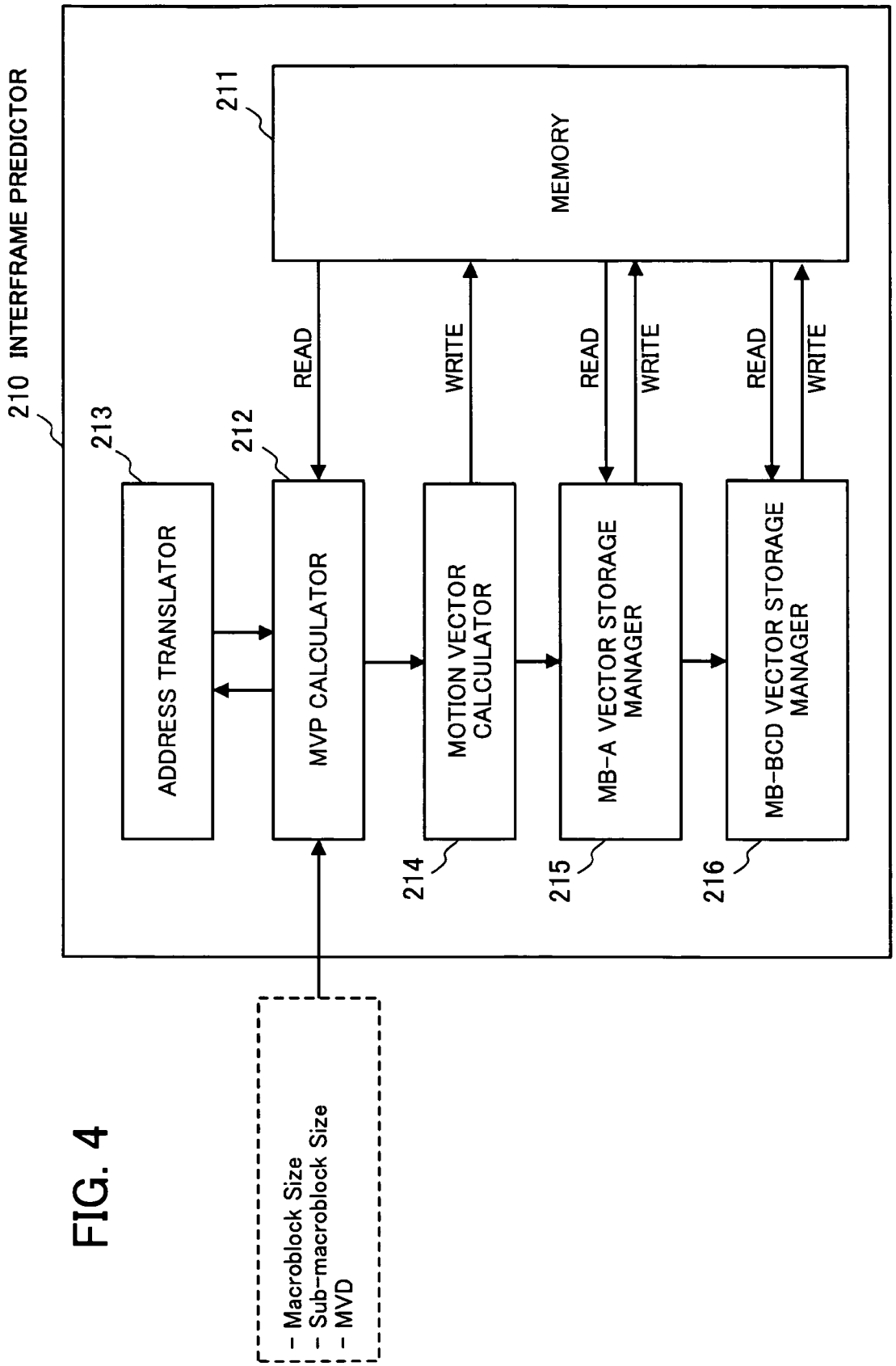
FIG. 4 is a functional block diagram of an interframe predictor, an element of the proposed video decoding device, that produces motion vectors in interframe prediction mode.

The interframe predictor 210 in the above-described video decoding device decodes motion vectors as follows. FIG. 4 is a functional block diagram of the interframe predictor 210. Specifically, the interframe predictor 210 includes the following elements: a memory 211, an MVP calculator 212, an address translator 213, a motion vector calculator 214, an MB-A vector storage manager 215, and an MB-BCD vector storage manager 216. As noted previously, the current macroblock is referred to by the symbol "Cu," and its adjacent macroblocks are referred to as "MB-A" (immediately left), "MB-B" (immediately above), "MB-C" (diagonally above the top-right corner), and "MB-D" (diagonally above the top-left corner). Also, three adjacent macroblocks MB-B, MB-C, and MB-D are collectively referred to by the symbol "MB-BCD."

The memory 211 stores motion vectors that have been calculated earlier for preceding macroblocks. Some of those motion vectors are used to calculate MVP of the current macroblock. The memory 211 also offers a storage space for the motion vector for the current block. More details will come later.

The MVP calculator 212 specifies each relevant adjacent macroblock surrounding the current macroblock to the address translator 213, thus obtaining the address of each corresponding representative vector storage location in the memory 211. With the representative vectors read out of the obtained addresses, the MVP calculator 212 calculates MVP. While there are various ways to determine MVP, the present embodiment calculates the median of motion vectors of adjacent macroblocks as a motion vector predictor MVP:

$$MVP = \text{Median}(MV\text{-}A, MV\text{-}B, MV\text{-}C) \quad (1)$$

where MV-A, MV-B, and MV-C refer to motion vectors of adjacent macroblocks MB-A, MB-B, and MB-C, respectively. The motion vector MV-C in formula (1) may be replaced with another motion vector MV-D of macroblock MB-D in the case the current macroblock is located on the right edge of the frame, where MV-C is not available. The median of three variables x, y, and z is expressed as follows:

$$\text{Median}(x,y,z) = x+y+z - \text{Min}(x, \text{Min}(y,z)) - \text{Max}(x, \text{Max}(y,z)) \quad (2)$$

where Min(x, y) denotes the smaller of x and y, and Max(x, y) the greater of x and y.

The address translator 213 translates a given adjacent macroblock size (or sub-macroblock size) into a representative vector storage location address. The motion vector calculator 214 reconstructs a motion vector from the MVP calculated by the MVP calculator 212 and the decoded MVD as follows:

$$MV = MVP + MVD \quad (3)$$

The resulting motion vector MV is saved in the memory 211, more particularly, in a representative vector storage location corresponding to the current macroblock.

The memory 211 maintains motion vectors calculated previously for each macroblock. The MB-A vector storage manager 215 reads out one of those stored motion vectors that corresponds to a macroblock to be referenced as an adjacent macroblock MB-A in the subsequent vector prediction process and enters it to an MB-A vector storage location. Likewise, the MB-BCD vector storage manager 216 reads out stored motion vectors corresponding to macroblocks to be referenced as adjacent macroblocks MB-B, MB-C, and MB-D in the subsequent vector prediction process and enters them to MB-BCD vector storage locations reserved in the same memory 211.

The above-described interframe predictor 210 operates according to an interframe prediction method proposed in the present embodiment. Details of interframe prediction will be described in the following sections.

Memory Arrangement for Motion Vectors

Figure 5:
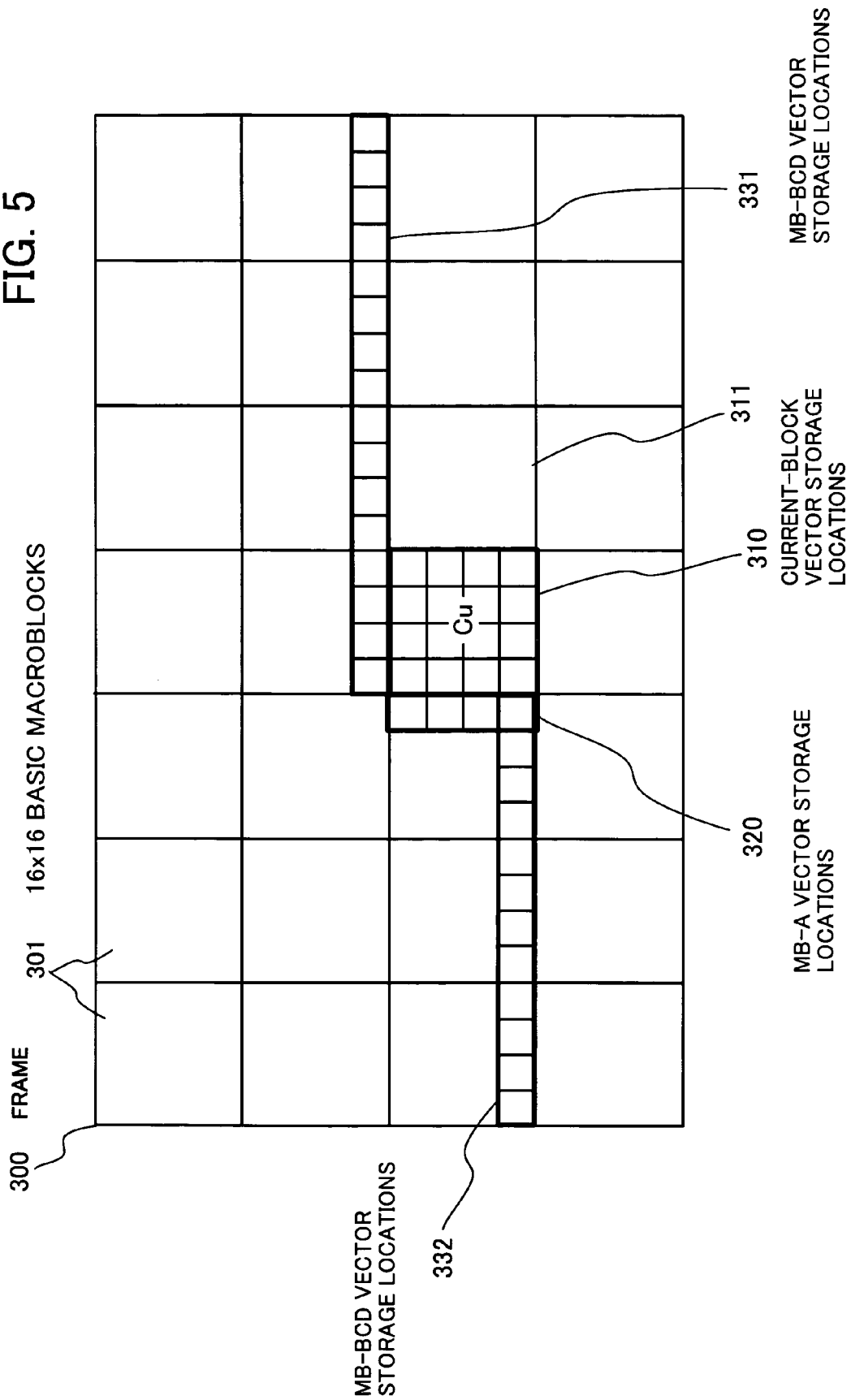
FIG. 5 shows the relationship between a frame structure and vector storage locations according to the present embodiment.

According to the present embodiment, the memory 211 provides vector storage locations reserved for calculated motion vectors. Specifically, FIG. 5 shows the relationship between a frame structure and several classes of vector storage locations according to the present embodiment. For interframe prediction, a given frame 300 is divided into a plurality of 16×16 basic macroblocks 301, where the size of macroblocks may be varied as necessary.

According to the present embodiment, the memory 211 provides current-block vector storage locations 310 to store motion vectors calculated for the current macroblock Cu. Also provided are adjacent-block data storage locations 320, 331, and 332 to store motion vectors of adjacent macroblocks MB-A and MB-BCD. The current-macroblock storage locations 310 can accommodate up to sixteen vectors, assuming that the 16×16 basic macroblock is partitioned into sixteen 4×4 sub-macroblocks, the minimum-size partitions.

The adjacent-block vector storage locations are divided into two classes. One class is MB-A vector storage locations 320 used to store motion vectors of macroblocks to be referenced as adjacent macroblocks MB-A. The MB-A vector storage locations 320 are mapped onto the four vertically-aligned 4×4 sub-macroblocks on the left of the current macroblock Cu. When motion vectors for the current macroblock Cu 310 become available in the current-block vector storage locations, the MB-A vector storage manager 215 copies them to those MB-A vector storage locations 320. Details will be described later with reference to FIG. 15.

Another class is MB-BCD vector storage locations 331 and 332 reserved to store motion vectors of macroblocks to be referenced as adjacent macroblocks MB-B, MB-C, and MB-D. The MB-BCD vector storage locations 331 are mapped onto the bottommost row of 4×4 sub-macroblocks immediately above the current macroblock Cu 310. This row includes adjacent macroblocks MB-B, MB-C, and MB-D. The MB-BCD vector storage locations 332 are mapped onto the bottommost row of 4×4 sub-macroblocks on the frame line to which the current macroblock Cu 310 belongs. When the motion vectors of the current macroblock Cu become available in the current-block vector storage locations 310, the MB-BCD vector storage manager 216 copies them to the MB-BCD storage locations 332. Those motion vectors in MB-BCD storage locations 332 will be referenced later when the focus reaches the next line of the frame. More details will be discussed later with reference to FIG. 16.

Motion vectors stored in the above vector storage locations in the memory 211 are updated as the processing focus moves. Suppose, for example, that the focus is moved from the current macroblock to the next macroblock 311. The vector storage locations that have been used to store the motion vectors of the preceding macroblock then begins to serve the new current macroblock 311. The MB-A vector storage locations 320 are thus used to store the motion vectors of the previous macroblock. The MB-BCD vector storage locations 331 and 332 are also rewritten in a similar way.

Sub-Macroblock Numbering

Figure 6:
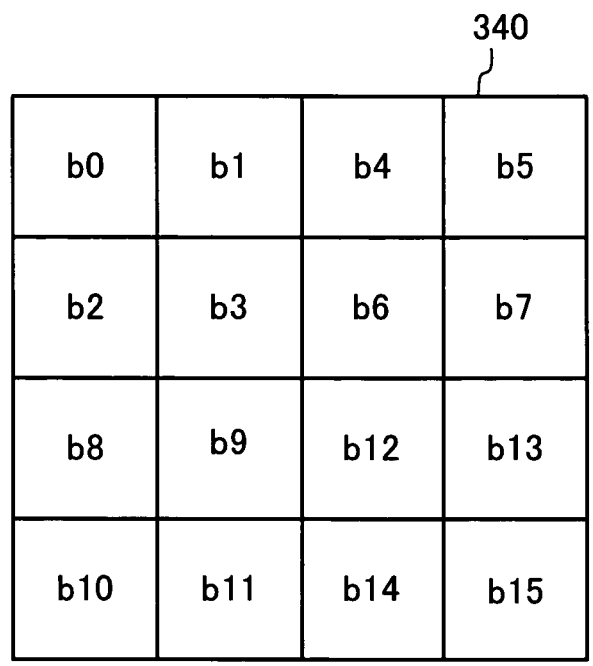
FIG. 6 shows 4×4 blocks constituting a 16×16 basic macroblock and their block numbers.

For convenience of explanation, the 4×4 sub-macroblock partitions of a basic macroblock are numbered as follows. FIG. 6 shows block numbers assigned to sixteen sub-macroblocks constituting a 16×16 basic macroblock 340. Specifically, the illustrated 16×16 basic macroblock 340 is first partitioned into four 8×8 macroblocks, and a numbering process takes place in the top-left, top-right, bottom-left, and bottom-right partitions in that order. Further, each 8×8 macroblock is partitioned into four 4×4 sub-macroblocks, and the resulting top-left, top-right, bottom-left, and bottom-right blocks are numbered in that order. As a result, the top-left, top-right, bottom-left, and bottom-right sub-macroblocks constituting the top-left 8×8 macroblock are numbered b0, b1, b2, and b3, respectively. Then the top-left, top-right, bottom-left, and bottom-right sub-macroblocks constituting the top-right 8×8 macroblock are numbered b4, b5, b6, and b7, respectively. Likewise, the four 4×4 sub-macroblocks constituting the bottom-left 8×8 macroblock are numbered b8 to b11, and those constituting the bottom-right 8×8 macroblock are numbered b12 to b15.

In the next section, the block numbers b0 to 15 defined above will be used to refer to vector storage locations corresponding to macroblock partitions.

Motion Vector Calculation and Storage Management

Referring back to FIG. 5, the MVP calculator 212 consults the address translator 213 to obtain the memory address in which the motion vector of each referenced adjacent macroblock is stored. The MVP calculator 212 reads out the required motion vector from the obtained memory address and calculates MVP according to formula (1). Then using formula (3), the motion vector calculator 214 produces a motion vector from the calculated MVP and decoded MVD, thus writing the result in a representative vector storage location in the memory 211. It is assumed now that the representative vector storage location corresponds to the 4×4 sub-macroblock at the top-left corner of the current macroblock.

FIGS. 7A and 7B show how the present embodiment produces motion vectors and how it saves them in memory in the case of 16×16 macroblocks. The MVP calculator 212 reads motion vectors of b5 400a of MB-A, b10 400b of MB-B, b10 400c of MB-C, and b15 400d of MB-D adjacent to the 16×16 current macroblock Cu 400, thus calculating MVP according to formula (1). Then using formula (3), the motion vector calculator 214 produces a motion vector MV0 from the calculated MVP and decoded MVD. The calculated motion vector MV0 is stored in b0 401 at the top-left corner of the current macroblock Cu 400.

Referring to the sequence diagram of FIG. 7B, the EN signal initiates a write cycle of MV0 into a storage location b0 with address WAD=0. When a later MVP calculation process makes reference to this vector, the address translator 213 provides the above storage address automatically, thus eliminating the need for duplicating the same vector over predetermined vector storage locations in the memory 211. That is, the proposed method writes only one address, whereas the conventional method writes sixteen addresses. The present embodiment greatly reduces the processing time.

FIGS. 8A and 8B show how the present embodiment produces representative motion vectors and how it saves them in memory in the case of 16×8 macroblocks.

Suppose that the current focus is on the upper 16×8 macroblock Cu0 411. The MVP calculator 212 reads motion vectors from b5 411a of MB-A, b10 411b of MB-B, b10 411c of MB-C, and b15 411d of MB-D, adjacent to the 16×8 current macroblock Cu0 411. The MVP calculator 212 determines MVP from those motion vectors, thus permitting the motion vector calculator 214 to calculate a motion vector MV0 for the current macroblock Cu0 411. The calculated motion vector MV0 is stored in block b0 412 at the top-left corner of the current macroblock Cu0 411.

Suppose now that the focus moves to the lower 16×8 macroblock Cu1 413. The MVP calculator 212 reads motion vectors from b13 413a of MB-A, b2 413b of Cu0 411 (as MB-B), and b7 413d of MB-D, adjacent to the 16×8 current macroblock Cu1 413. The MVP calculator 212 determines MVP from those motion vectors, thus permitting the motion vector calculator 214 to calculate a motion vector MV1 for the current macroblock Cu1 413. Note that there is no calculated motion vector for macroblock X 413c at the position of adjacent macroblock MB-C. For this reason, the motion vector MV1 is calculated by modifying formula (1) such that the median of motion vectors MV-A, MV-B, and MV-D will be selected. The calculated MV1 is then stored in b8 414 at the top-left corner of the current macroblock Cu1 413.

Referring to the sequence diagram of FIG. 8B, the EN signal is asserted twice to initiate two write cycles. The first write cycle stores MV0 into a storage location b0 with address WAD=0. The second write cycle stores MV1 into another storage location b8 with address WAD=8.

FIGS. 9A and 9B show how the present embodiment produces representative motion vectors and how it saves them in memory in the case of 8×16 macroblocks. Suppose that the current focus is on the left 8×16 macroblock Cu0 421. The MVP calculator 212 reads motion vectors from b5 421a of MB-A, b10 421b of MB-B, b14 421c of MB-C, and b15 421d of MB-D adjacent to the 8×16 current macroblock Cu0 421. The MVP calculator 212 determines MVP from those motion vectors, thus permitting the motion vector calculator 214 to calculate a motion vector MV0 for the current macroblock Cu0 421. The calculated motion vector MV0 is stored in b0 422 at the top-left corner of the current macroblock Cu0 421.

Suppose now that the focus moves to the right 8×16 macroblock Cu1 423. The MVP calculator 212 reads motion vectors from b1 423a of MB-A (=previous 8×16 macroblock Cu0), b14 423b of MB-B, b10 423c of MB-C, b11 423d of MB-D adjacent to the 16×8 current macroblock Cu0 411. The MVP calculator 212 determines MVP from those motion vectors, thus permitting the motion vector calculator 214 to calculate a motion vector MV1 for the current macroblock Cu1 423. The calculated motion vector MV1 is stored in b4 424 at the top-left corner of the current macroblock Cu1 423.

Referring to the sequence diagram of FIG. 9B, the EN signal is asserted twice to initiate two write cycles. The first write cycle stores MV0 into a storage location b0 with address WAD=0. The second write cycle stores MV1 into another storage location b4 with address WAD=4.

FIGS. 10A and 10B show how the present embodiment produces representative motion vectors and how it saves them in memory in the case of 8×8 macroblocks. Suppose that the current focus is on the top-left 8×8 macroblock Cu0 431. The MVP calculator 212 reads motion vectors from b5 431a of MB-A, b10 431b of MB-B, b14 431c of MB-C, and b15 431d of MB-D adjacent to the current macroblock Cu0 431. The MVP calculator 212 determines MVP from those motion vectors, thus permitting the motion vector calculator 214 to calculate a motion vector MV0 for the current macroblock Cu0 431. The calculated motion vector MV0 is stored in b0 432 at the top-left corner of the current macroblock Cu0 431.

Suppose that the focus moves to the top-right 8×8 macroblock Cu1 433. Then the MVP calculator 212 reads motion vectors from b1 433a of MB-A (=previous 8×8 macroblock Cu0 431), b14 433b of MB-B, b10 433c of MB-C, and b11 433d of MB-D surrounding the current macroblock Cu1 433. The MVP calculator 212 determines MVP from those motion vectors, thus permitting the motion vector calculator 214 to calculate a motion vector MV1 for the current macroblock Cu1 433. The calculated motion vector MV1 is stored in b4 434 at the top-left corner of the current macroblock Cu1 433.

Suppose that the focus moves to the bottom-left 8×8 macroblock Cu2 435. Then the MVP calculator 212 reads motion vectors from b13 435a of MB-A, b2 (435b) of MB-B (=top-left 8×8 macroblock Cu0 431), b6 435c of MB-C (=top-right 8×8 macroblock Cu1 433), and b7 435d of MB-D surrounding the current macroblock Cu2 435. The MVP calculator 212 determines MVP from those motion vectors, thus permitting the motion vector calculator 214 to calculate a motion vector MV2 for the current macroblock Cu2 435. The calculated motion vector MV2 is stored in b8 436 at the top-left corner of the current macroblock Cu2 435.

Suppose that the focus moves to the bottom-right 8×8 macroblock Cu3 437. Then the MVP calculator 212 reads motion vectors from b9 437a of MB-A (=preceding 8×8 macroblock Cu2 435), b6 437b of MB-B (=top-right macroblock Cu1 433), and b3 437d (=top-left macroblock Cu0 431) surrounding the current macroblock Cu3 437. The MVP calculator 212 determines MVP from those motion vectors, thus permitting the motion vector calculator 214 to calculate a motion vector MV3 for the current macroblock Cu3 437. Note that the partition X 437c at the position of MB-C is not considered in this process. The resulting vector MV3 is stored in b12 438 at the top-left corner of the current macroblock Cu3 437.

Referring to the sequence diagram of FIG. 10B, the EN signal is asserted four times to initiate four write cycles. The first write cycle stores MV0 into a storage location b0 with address WAD=0. The second write cycle stores MV1 into another storage location b4 with address WAD=4. The third write cycle stores MV2 into a storage location b8 with address WAD=8. The fourth write cycle stores MV3 into another storage location b12 with address WAD=12.

FIGS. 11A, 11B, 12A, and 12B show how the present embodiment partitions a macroblock into sub-macroblocks and how it produces and saves a representative motion vector for them. Specifically, FIG. 11A shows an example of macroblock sub-partitioning, and FIG. 11B shows representative motion vectors produced for sub-macroblocks SB0 to SB2. FIG. 12A shows representative motion vectors produced for yet another sub-macroblock SB3. FIG. 12B is a sequence diagram showing how the resulting motion vectors are saved in the memory 211.

Referring to FIG. 11A, an example of macroblock sub-partitioning is shown. Each 8×8 macroblock may be partitioned into smaller blocks. Specifically, the top-left 8×8 macroblock is not really partitioned, but remains as a single 8×8 block SB0 441. The top-right 8×8 macroblock is divided into two 8×4 blocks, SB1-0 451 and SB1-1 453. The bottom-left 8×8 macroblock is divided into two 4×8 blocks, SB2-0 461 and SB2-1 463. The bottom-right 8×8 macroblock is divided into four 4×4 blocks, SB3-0 471, SB3-1 472, SB3-2 473, and SB3-3 474.

Referring to FIG. 11B, motion vectors for those sub-macroblocks are determined as follows. For the top-left sub-macroblock SB0 441, a motion vector MV0 is determined from motion vectors of surrounding blocks and saved in b0 442 at the top-left corner of SB0 441. For the upper 8×4 sub-macroblock SB1-0 451, a motion vector MV1 is determined from motion vectors of surrounding blocks and saved in b4 452 corresponding to the left half of SB1-0 451. Likewise, a motion vector MV2 is produced for the lower 8×4 sub-macroblock SB1-1 453 and saved in b6 454 corresponding to the left half of SB1-1 453. A motion vector MV3 is produced for the left 4×8 sub-macroblock SB2-0 461 and saved in b8 462, and a motion vector MV4 is produced for the right 4×8 sub-macroblock and saved in b9 464 in a similar way.

Referring to FIG. 12A, motion vectors MV5, MV6, MV7, and MV8 are determined for the minimum-sized sub-macroblocks SB3-0 471, SB3-1 472, SB3-2 473, and SB3-3 474, respectively. Those motion vectors are saved in their corresponding storage locations b12, b13, b14, and b15.

Referring to the sequence diagram of FIG. 12B, the EN signal initiates nine write cycles. The first write cycle stores MV0 in b0 with address WAD=0, and the second write cycle stores MV1 in b4 with address WAD=4. The third write cycle stores MV2 in b6 with address WAD=6, and the fourth write cycle stores MV3 in b8 with address WAD=8. The fifth write cycle stores MV4 in b9 with address WAD=9, and the sixth write cycle stores MV5 in b12 with address WAD=12. The seventh write cycle stores MV6 in b13 with address WAD=13, and the eight write cycle stores MV7 in b14 with address WAD=14. Lastly, the ninth write cycle stores MV8 in b15 with address WAD=15.

The present embodiment saves a produced motion vector only in a specific vector storage location (e.g., the one corresponding to the top-left block) that represents the macroblock domain in which that vector is produced. As can be seen from FIG. 7A to 10B, the prediction process for a partitioned basic macroblock involves four write cycles at most if the partition size is 8×8 or more. It is only when every partition is a 4×4 block that all the sixteen storage locations for a basic macroblock are filled. In most cases, the prediction process is completed with a smaller number of write cycles, unlike the conventional process. The present embodiment thus reduces the time required to predict motion vectors.

The above-described process permits motion vectors to be stored in vector storage locations 310, 320, 331, and 332 reserved for the current macroblock Cu and its surrounding macroblocks MB-A and MB-BCD as discussed in FIG. 5.

Address Translation

The address translator 213 serves the MVP calculator 212 by translating given information specifying an adjacent macroblock into a specific address of a representative vector storage location corresponding to that macroblock. That is, the address translator 213 receives from the MVP calculator 212 a piece of information specifying a 4×4 adjacent macroblock to be referenced. More specifically, the MVP calculator 212 sends the identifier of a desired 16×16 basic macroblock, along with a specific block number (e.g., b0 to b15 shown in FIG. 6). The address translator 213 has an address translation table associating macroblock sizes and sub-macroblock sizes with representative vector storage locations to provide an address corresponding to a specified adjacent macroblock.

As discussed earlier in FIG. 5, the present embodiment reads out a reference motion vector from vector storage locations 320, 331, and 332 corresponding to adjacent macroblocks MB-A and MB-BCD when that reference motion vector lies outside the currently processed macroblock Cu. Whether a particular reference motion vector is an external vector or internal vector depends not only on the shape of the current macroblock, but also on the location of the current macroblock. This section will first explain the case of internal motion vectors and then proceeds to the case of external motion vectors.

For explanatory purposes, let us assume that external vectors can be handled in the same way as internal vectors. That is, it is assumed that motion vectors in every macroblock is stored in the same way as the current macroblock Cu of FIG. 5.

Figure 13:
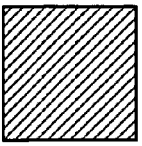
FIG. 13 shows how an address translation table is used to make reference to 16×16 macroblocks and 16×8 macroblocks.
Figure 24:
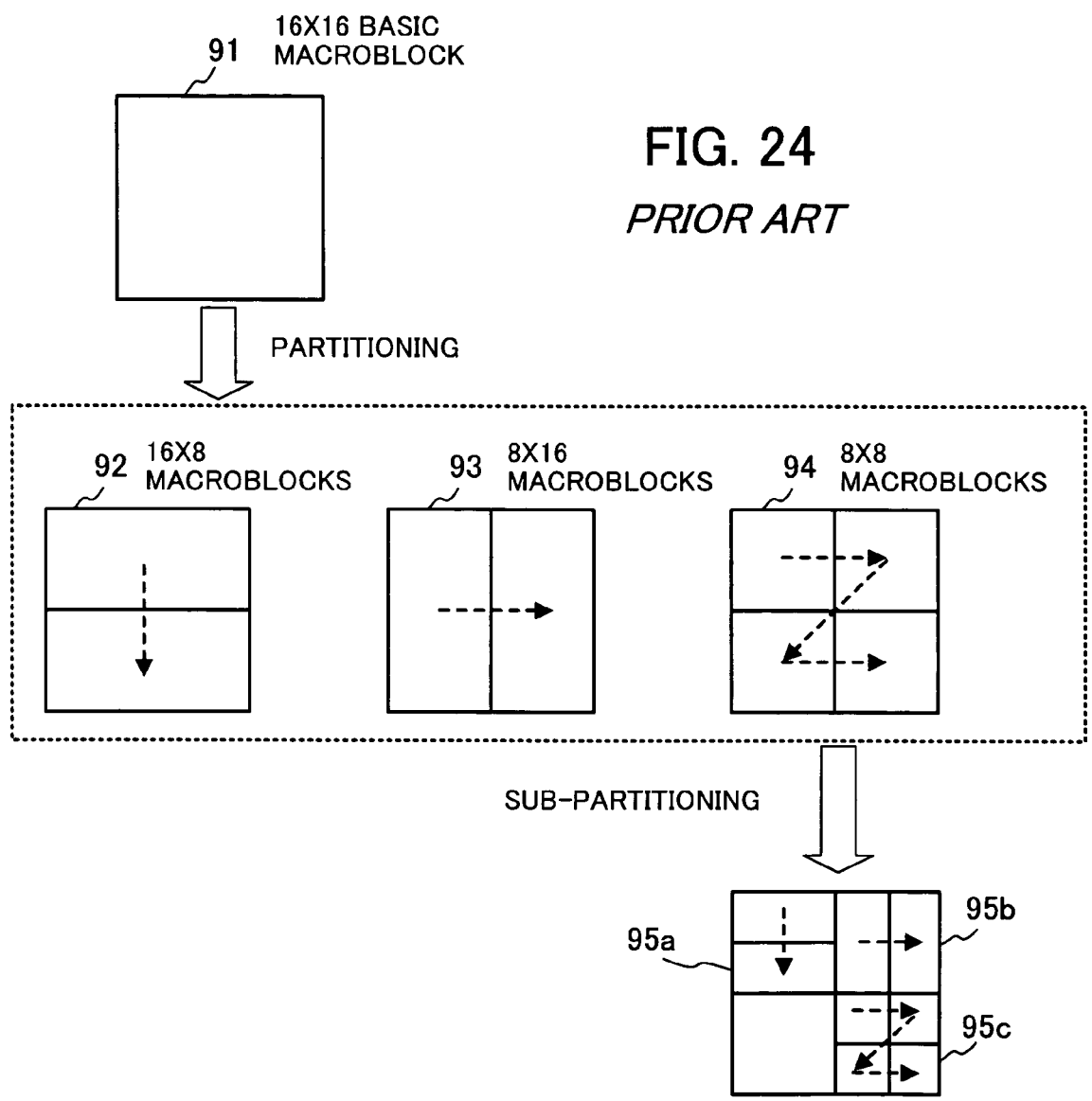
FIG. 24 shows various sizes of macroblocks defined in H.264.
Figure 25:
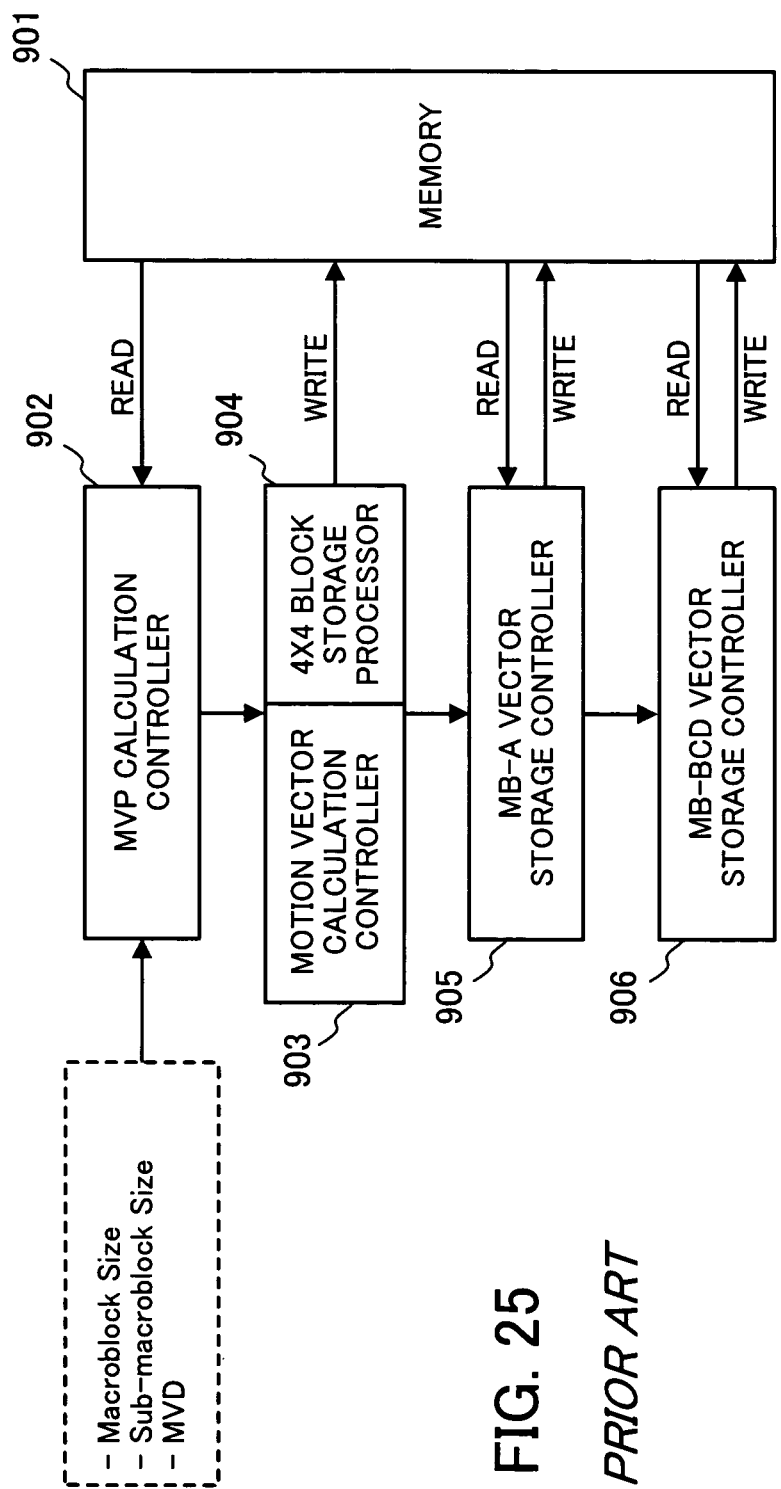
FIG. 25 is a block diagram of a motion vector estimator in a conventional video decoding device.
Figure 26:
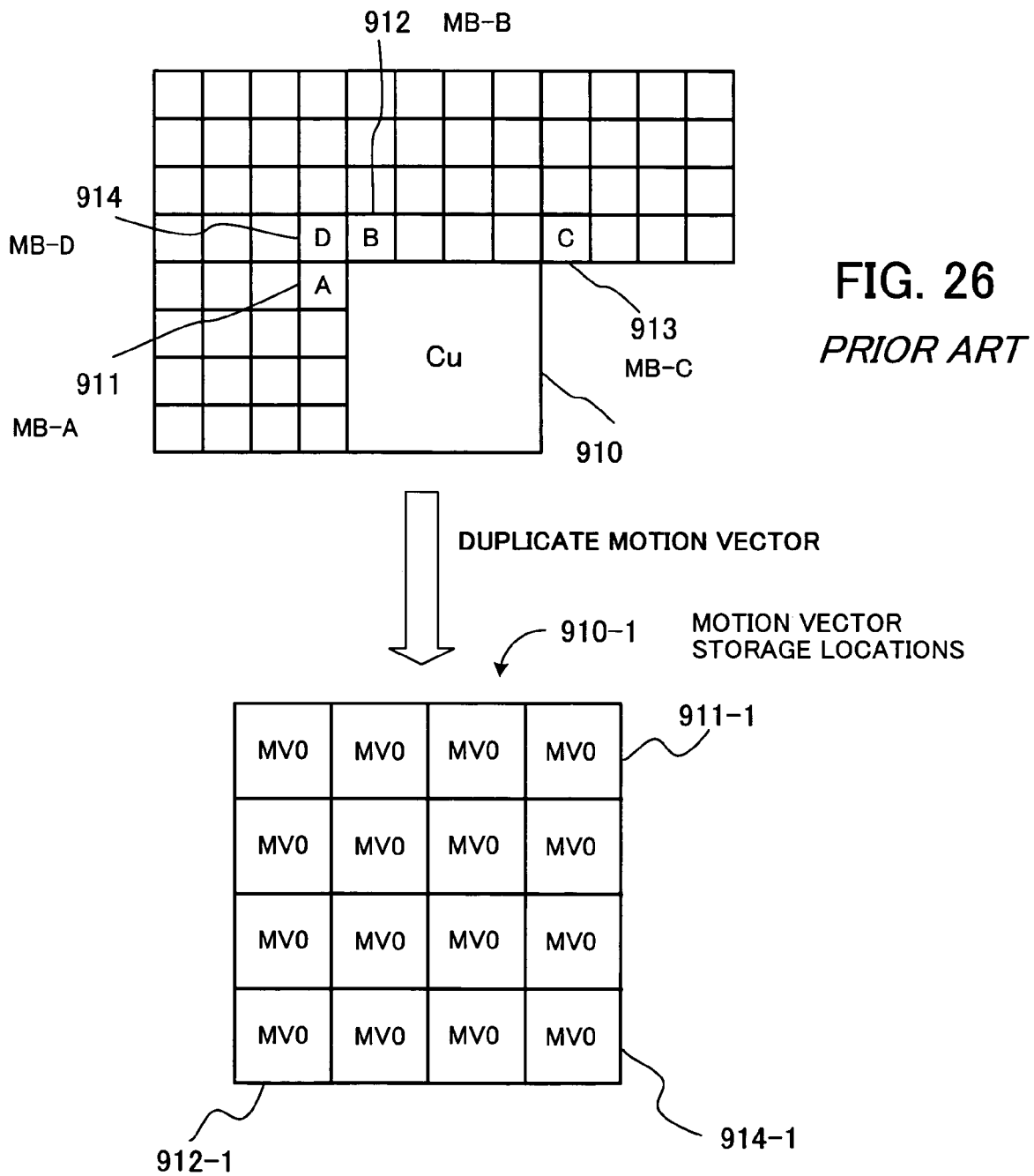
FIG. 26 shows macroblocks adjacent to a 16×16 macroblock and motion vectors spread over 4×4 blocks.

FIGS. 13 and 14 shows how the address translation table functions in the present embodiment. Specifically, FIG. 13 shows how the address translation table is used to make reference to 16×16 macroblocks and 16×8 macroblocks. FIG. 14 shows how the address translation table is used to make reference to 8×16 macroblocks, 8×8 macroblocks, 8×4 sub-macroblocks, 4×8 sub-macroblocks, and 4×4 sub-macroblocks.

When the adjacent macroblock is a 16×16 macroblock, the MVP calculator 212 may specify one of the sixteen blocks b0 to b15 in its address request. The representative vector is, however, stored only in one vector storage location corresponding to block b0 in this case, as discussed in FIG. 7. In response to the request from the MVP calculator 212, the address translator 213 thus returns the vector storage location address of block b0, regardless of which block is specified in the request. The macroblocks referenced as adjacent macroblocks have undergone the vector prediction processing, meaning that their sizes are known. The embodiment may therefore be configured to retain the size information of such an adjacent macroblock somewhere in memory for later reference.

When the adjacent macroblock is an upper 16×8 macroblock, the MVP calculator 212 may specify one of the first eight blocks b0 to b7 in its address request. The representative vector in this case is stored in a vector storage location corresponding to block b0 as discussed in FIG. 8. In response to the request from the MVP calculator 212, the address translator 213 thus returns the vector storage location address of block b0, regardless of which block is specified in the request.

When the adjacent macroblock is a lower 16×8 macroblock (not shown), the MVP calculator 212 may specify one of the second eight blocks b8 to b15 in its address request. The representative vector in this case is stored in a vector storage location corresponding to block b8 as discussed in FIG. 8. The address translator 213 thus returns the vector storage location address of block b8 to the MVP calculator 212, regardless of which block is specified in the request.

Referring to FIG. 14, when the adjacent macroblock is a left 8×16 macroblock, the MVP calculator 212 may specify one of the following blocks in its address request: b0, b1, b2, b3, b8, b9, b10, and b11. The representative vector in this case is stored in a vector storage location corresponding to block b0 as discussed in FIG. 9. The address translator 213 thus returns the address for that block b0 to the MVP calculator 212.

When the adjacent macroblock is a right 8×16 macroblock (not shown in FIG. 14), the MVP calculator 212 may specify one of the following blocks in its address request: b4, b5, b6, b7, b12, b13, b14, and b15. The representative vector in this case is stored in a vector storage location corresponding to block b4 as discussed in FIG. 9. The address translator 213 thus returns the address for that block b4 to the MVP calculator 212.

When the adjacent macroblock is a top-left 8×8 macroblock, the MVP calculator 212 may specify a block b0, b1, b2, or b3. The representative vector in this case is stored in a vector storage location corresponding to block b0 as discussed in FIG. 10. The address translator 213 thus returns the address for that block b0 to the MVP calculator 212. Likewise, when the MVP calculator 212 specifies a top-right 8×8 macroblock (not shown in FIG. 14) and a block b4, b5, b6, or b7, the address translator 213 returns the address of a representative vector storage location for block b4. When the MVP calculator 212 specifies a bottom-left 8×8 macroblock (not shown in FIG. 14) and a block b8, b9, b10, or b11, the address translator 213 returns a representative vector storage location address for block b8. When the MVP calculator 212 specifies a bottom-right 8×8 macroblock (not shown in FIG. 14) and a block b12, b13, b14, or b15, the address translator 213 returns a representative vector storage location address for block b12.

The motion vector calculator 214 may request an address for a sub-macroblock. The following part of the description explains how the address translator 213 handles this request, assuming, for simplicity, that the specified sub-macroblock belongs to a top-left 8×8 macroblock. The address translator 213 handles other types of sub-macroblocks in a similar way to determine a representative vector storage location uniquely from specified block size and position.

In the case of an upper 8×4 sub-macroblock of a top-left 8×8 macroblock, the motion vector calculator 214 may specify either block b0 or block b1 as an adjacent macroblock. The representative vector storage location in this case is a vector storage location corresponding to block b0. The address translator 213 thus returns the address of that vector storage location to the motion vector calculator 214.

In the case of a left 8×4 sub-macroblock of a top-left 8×8 macroblock, the motion vector calculator 214 may specify either block b0 or block b2 as an adjacent macroblock. The representative vector storage location in this case is a vector storage location corresponding to block b0. The address translator 213 thus returns the address of that vector storage location to the motion vector calculator 214.

In the case of a top-left 4×4 sub-macroblock of a top-left 8×8 macroblock, the motion vector calculator 214 may specify block b0 as an adjacent macroblock. The representative vector storage location in this case is a vector storage location corresponding to block b0. The address translator 213 thus returns the address of that vector storage location to the motion vector calculator 214.

As can be seen from the above, the representative vector storage location can be determined by looking up a translation table with the macroblock size and sub-macroblock size of an adjacent macroblock and the specified block position (b0 to b15). This feature permits the MVP calculator 212 to reach the motion vector stored in a representative vector storage location by the motion vector calculator 214.

Although what is shown in FIGS. 13 and 14 is not a translation table per se, the essential function of the proposed address translation table is to derive a storage address from a specified combination of adjacent macroblock size and block position. The translation table may therefore be in any form that can associate possible combinations of a macroblock size and sub-macroblock size of an adjacent macroblock and a specified block position (b0 to b15) with specific representative vector storage locations.

Representative Vector Storage Locations

In the case where the desired reference motion vector is located outside the current macroblock Cu, the present embodiment operates as follows. Suppose, for example, that the current focus is on a 16×16 basic macroblock. Every reference motion vectors in this case have to be found somewhere in vector storage locations 320, 331, and 332 (FIG. 5) reserved for adjacent macroblocks MB-A and MB-BCD.

FIG. 15 shows how the present embodiment saves motion vectors of adjacent macroblocks in MB-A vector storage locations. Suppose that the current focus is on a macroblock 501. A vector prediction process for this current macroblock 501 makes reference to its adjacent blocks MB-A (A0, A1, A2, A3). The macroblock 502 preceding the current macroblock 501 has already been processed, and the resulting motion vectors are stored in vector storage locations as representative motion vectors. The MB-A vector storage manager 215 reads out relevant representative motion vectors and stores them in storage locations corresponding to MB-A (A0, A1, A2, A3). In the case where a plurality of representative motion vectors exist on the same row, the MB-A vector storage manager 215 chooses and enters the rightmost vector to a corresponding MB-A vector storage location. When, for example, the macroblock 502 is horizontally partitioned into 8×16 macroblocks, representative motion vectors are calculated for two blocks b0 and b4 on the row of A0. In this case, the MB-A vector storage manager 215 chooses and stores the vector of block b4 in A0 since b4 is located to the right of b0.

FIG. 16 shows how the present embodiment saves motion vectors of adjacent macroblocks in MB-BCD vector storage locations. A vector prediction process for the current macroblock 501 makes access to the MB-BCD vector storage locations N0, N1, N2, N3, N4, and N5 as necessary. Macroblocks 503, 504, and 505 have already been processed, and the resulting motion vectors are stored in vector storage locations as representative motion vectors. The MB-BCD vector storage manager 216 reads out relevant representative motion vectors of macroblock 503, for example, and it stores them in MB-BCD vector storage locations N1, N2, N3, and N4. Similarly, MB-BCD vector storage locations N0 and N5 receive representative motion vectors produced for macroblocks 504 and 505, respectively. In the case where a plurality of representative motion vectors exist on the same column, the MB-BCD vector storage manager 216 chooses and enters the bottommost vector to a corresponding MB-BCD vector storage location. For example, when the macroblock 503 is vertically partitioned into 16×8 macroblocks, representative motion vectors are calculated for two blocks b0 and b8 on the column of N1. In this case, the MB-BCD vector storage manager 216 chooses and stores the vector of block b8 in N1 since b8 is closer to the bottom than is b0.

The storage address for a representative motion vector depends on the block size. The following will describe a process of storing motion vectors for each block size. FIGS. 17A to 19B show representative vector storage locations for adjacent macroblocks according to the present embodiment. More specifically, FIG. 17 shows those for a 16×16 macroblock. The motion vector calculator 214 produces one representative motion vector MV0 for a 16×16 macroblock 510 and stores it in block b0. The MB-A vector storage manager 215 reads out MV0 from block b0 and stores it in an MB-A vector storage location A0 511 located to the right of b0. Also, the MB-BCD vector storage manager 216 reads MV0 out of block b0 and stores it in an MB-BCD vector storage location N1 512 located below b0.

FIG. 17B shows representative vector storage locations for adjacent 16×8 macroblocks. In the case where a 16×16 basic macroblock is partitioned into two 16×8 macroblocks 520, the motion vector calculator 214 produces two representative motion vectors MV0 and MV8. The motion vector calculator 214 stores MV0 in block b0 and MV8 in block b8. The MB-A vector storage manager 215 reads out MV0 and MV8 from blocks b0 and b8 and stores them in MB-A vector storage locations A0 521 and A2 522 located to the right of b0 and b8, respectively. The MB-BCD vector storage manager 216, on the other hand, chooses MV8 since b8 is closer to the bottom edge than is b0. The MB-BCD vector storage manager 216 then stores this MV8 in an MB-BCD vector storage location N1 523 located below b0 and b8.

FIG. 18A shows representative vector storage locations for adjacent 8×16 macroblocks. In the case where a 16×16 basic macroblock is partitioned into two 8×16 macroblocks 530, the motion vector calculator 214 produces two representative motion vectors MV0 and MV4 and stores them in blocks b0 and b4, respectively. The MB-A vector storage manager 215, in this case, selectively reads out MV4 from block b4 since b4 is nearer the right edge than is b0. The MB-A vector storage manager 215 then stores it in an MB-A vector storage location A0 531 located to the right of b4. The MB-BCD vector storage manager 216, on the other hand, reads out MV0 and MV4 from blocks b0 and b4 and stores them in MB-BCD vector storage locations N1 532 and N3 533 below b0 and b4, respectively.

FIG. 18B shows representative vector storage locations for adjacent 8×8 macroblocks. In the case where a 16×16 basic macroblock is partitioned into 8×8 macroblocks 540, the motion vector calculator 214 produces four representative motion vectors MV0, MV4, MV8, and MV12 and stores them in blocks b0, b4, b8, and b12, respectively. The MB-A vector storage manager 215, in this case, reads out MV4 and MV12 from block b4 and b12 since they are nearer to the right edge than are b0 and b8, respectively. The MB-A vector storage manager 215 then stores MV4 and MV12 in MB-A vector storage locations A0 541 and A2 542. The MB-BCD vector storage manager 216, on the other hand, reads out MV8 and MV12 since b8 and b12 are closer to the bottom edge than are b0 and b4. The MB-BCD vector storage manager 216 then stores MV8 and MV12 in MB-BCD vector storage locations N1 543 and N3 544, respectively.

FIG. 19 shows representative vector storage locations for adjacent 4×4 sub-macroblocks. In the case where a 16×16 basic macroblock is partitioned into two 4×4 sub-macroblocks 550, the motion vector calculator 214 produces sixteen representative motion vectors MV0 to MV15 and stores them in blocks b0 to b15, respectively. The MB-A vector storage manager 215, in this case, chooses the rightmost motion vectors MV5, MV7, MV13, and MV15 and stores them in MB-A vector storage locations A0, A1, A2, and A3, respectively. Likewise, the MB-BCD vector storage manager 216 chooses the bottommost motion vectors MV10, MV11, MV14, and MV15 and stores them in MB-BCD vector storage locations N1, N2, N3, and N4, respectively. While not shown in FIG. 19, the MB-A vector storage manager 215 and MB-BCD vector storage manager 216 will work in a similar way in the case of 8×4 sub-macroblock and 4×8 sub-macroblocks.

Address Translation in Vector Prediction

This section describes how address is translated when the MVP calculator 212 refers to outside motion vectors in MB-A or MB-BCD vector storage locations. The MVP calculator 212 gives the address translator 213 a piece of information specifying a specific adjacent 4×4 block. Upon receipt of this information, the address translator 213 determines whether there is an MB-A or MB-BCD vector storage location directly corresponding to the specified block. If not, the translation table discussed earlier in FIGS. 13 and 14 is used to provide an address of a relevant vector storage location. If there is, the address translator 213 produces an address by consulting another translation table as will be described with reference to FIGS. 20 to 23.

FIGS. 20 and 21 show how an address translation table is used to make reference to MB-A vector storage locations. Specifically, FIG. 20 shows the case where the source macroblock of a motion vector stored in an MB-A vector storage location is a 16×16, 16×8, 8×16, or 8×8 macroblock. FIG. 21 shows the case of 8×4, 4×8, or 4×4 sub-macroblock.

In the case where the source macroblock size of MB-A is 16×16, only a single motion vector MV0 is stored in A0 out of the four available vector storage locations reserved for MB-A. While the MVP calculator 212 may specify A0, A1, A2, or A3, the translation table translates all these locations into the address of A0, thus permitting the MVP calculator 212 to read out MV0 from the same location A0 in this case.

In the case of 16×8 source macroblocks, two motion vectors MV0 and MV8 are stored in vector storage locations A0 and A2, respectively. When the MVP calculator 212 specifies A0 or A1, the translation table translate it to the address of A0. When the MVP calculator 212 specifies A2 or A3, the translation table translate it to the address of A2. The MVP calculator 212 can therefore obtain MV0 for A0 and A1, and MV2 for A2 and A3.

In the case of 8×16 source macroblocks, one motion vector MV4 is stored in the topmost vector storage location A0. When the MVP calculator 212 specifies A0, A1, A2, or A3, the translation table translates all these locations into the address of A0. The MVP calculator 212 therefore reads out MV0 in this case, no matter which block it specifies.

In the case of 8×8 source macroblocks, two motion vectors MV4 and MV12 are stored in vector storage locations A0 and A2, respectively. When the MVP calculator 212 specifies A0 or A1, the translation table translates it to the address of A0. When the MVP calculator 212 specifies A2 or A3, the translation table translates it to the address of A2. The MVP calculator 212 can therefore obtain MV4 for A0 and A1, and MV12 for A2 and A3.

FIG. 21 shows how the address is translated in the case of sub-partitioned MB-A blocks. FIG. 21 omits illustration of the left half of each basic macroblock since MB-A vector storage locations store the same set of representative motion vectors, no matter what block structure the left half may take.

In the case where the source macroblock is partitioned into 8×4 sub-macroblocks, motion vectors MV4, MV6, MV12, and MV14 are stored in vector storage locations A0, A1, A2, and A3, respectively. When the MVP calculator 212 specifies A0, A1, A2, or A3, the translation table translates those locations to their respective addresses.

In the case of 4×8 sub-macroblocks, motion vectors MV5 and MV13 are stored in vector storage locations A0 and A2, respectively. When the MVP calculator 212 specifies A0 or A1, the translation table translates it to the address of A0. When the MVP calculator 212 specifies A2 or A3, the translation table translates it to the address of A2.

In the case of 4×4 sub-macroblocks, motion vectors MV5, MV7, MV13, and MV15 are stored in vector storage locations A0, A1, A2, and A3, respectively. When the MVP calculator 212 specifies A0, A1, A2, or A3, the translation table translates those locations to their respective addresses.

As can be seen from FIGS. 20 and 21, the address translator 213 translates specified MB-A block locations to prescribed memory addresses by consulting its local address translation table. The obtained address is passed to the MVP calculator 212 for use in reading out a desired representative motion vector.

A similar address translation process takes place for MB-BCD vector storage locations. Specifically, FIGS. 22 and 22 show how the address translator 213 uses an address translation table to make reference to MB-BCD vector storage locations. More specifically, FIG. 22 shows address translation in the case where the source macroblock of a motion vector stored in an MB-BCD vector storage location is a 16×16, 16×8, 8×16, or 8×8 macroblock, while FIG. 23 shows the case of 8×4, 4×8, or 4×4 sub-macroblock.

In the case where the source macroblock size is 16×16, a single motion vector MV0 is stored in N1 out of the four available vector storage locations of MB-BCD. When the MVP calculator 212 specifies N1, N2, N3 or N4, the translation table translates it to the address of N1, thus permitting the MVP calculator 212 to read out MV0, no matter which block it specifies.

In the case of 16×8 macroblocks, a single motion vector MV8 is stored in a vector storage location N1. When the MVP calculator 212 specifies N1, N2, N3 or N4, the translation table translates it into the address of N1, thus permitting the MVP calculator 212 to read out MV8, no matter which block it specifies.

In the case of 8×16 macroblocks, motion vectors MV0 and MV4 are stored in vector storage locations N1 and N3, respectively. When the MVP calculator 212 specifies N1 or N2, the translation table translates it into the address of N1. When the MVP calculator 212 specifies N3 or N4, the translation table translates it into the address of N3. The MVP calculator 212 can therefore obtain MV0 for N1 and N2, and MV4 for N3 and N4.

In the case of 8×8 macroblocks, motion vectors MV8 and MV12 are stored in vector storage locations N1 and N3, respectively. When the MVP calculator 212 specifies N1 or N2, the translation table translates it into the address of N1. When the MVP calculator 212 specifies N3 or N4, the translation table translates it into the address of N3. The MVP calculator 212 can therefore obtain MV8 for N1 and N2, and MV12 for N3 and N4.

FIG. 23 shows how the address is translated in the case of sub-partitioned MB-BCD blocks. FIG. 23 omits illustration of the upper half of each basic macroblock since MB-BCD vector storage locations store the same set of representative motion vectors, no matter what block structure the upper half may take.

In the case of 8×4 sub-macroblocks, motion vectors MV8 and MV12 are stored in vector storage locations N1 and N3. When the MVP calculator 212 specifies N1 or N2, the translation table translates it into the address of N1. When the MVP calculator 212 specifies N3 or N4, the translation table translates it into the address of N3.

In the case of 4×8 sub-macroblocks, motion vectors MV8, MV9, MV12, and MV13 are stored in vector storage locations N1, N2, N3, and N4, respectively. When the MVP calculator 212 specifies N1, N2, N3, or N4, the translation table translates those locations to their respective addresses.

In the case of 4×4 sub-macroblocks, motion vectors MV10, MV11, MV14, and MV15 are stored in vector storage locations N1, N2, N3, and N4, respectively. When the MVP calculator 212 specifies N1, N2, N3, or N4, the translation table translates those locations to their respective addresses.

As can be seen from FIGS. 22 and 23, the address translator 213 translates specified MB-BCD block locations to prescribed memory addresses by consulting its local address translation table. The obtained address is passed to the MVP calculator 212 for use in reading out a desired representative motion vector.

Reduced Vector Write Cycles

The above sections have described how the address translator 213 provides memory address for the MVP calculator 212 to read reference motion vectors for vector prediction. This arrangement of the present embodiment eliminates the need for the motion vector calculator 214 to expand each calculated motion vector in multiple memory locations for the purpose of later reference.

By removing unnecessary vector write cycles, the present embodiment reduces the time required to calculate motion vectors. In the case of, for example, a 16×16 macroblock, the conventional vector calculation process takes sixteen write cycles to save a calculated motion vector, four write cycles to fill the MB-A vector storage locations, and another four write cycles to fill the MB-BCD vector storage locations. This means that the process includes 24 memory write cycles. In contrast to this, the present embodiment takes one write cycle to save a calculated motion vector, another write cycle to fill an MB-A vector storage location, and yet another write cycle to fill an MB-BCD vector storage location. That is, the present embodiment only requires three write cycles to process a 16×16 macroblock. This means that the number of write cycles can be reduced by maximum 21 cycles.

Think of 8×8 macroblocks, for another instance. While the conventional process takes sixteen write cycles as in the case of 16×16 macroblocks, the present embodiment consumes eight cycles to save calculated motion vectors, two cycles to fill MB-A vector storage locations, and another two cycles to fill MB-BCD vector storage locations. The present embodiment only requires 12 memory write cycles, achieving the reduction of maximum 12 cycles. The effect of this write cycle reduction will be more prominent when the vector calculation process deals with a larger size of macroblocks, or when it processes wider and finer pictures.

CONCLUSION

According to the present invention, the proposed interframe prediction processor employs an address calculator to automatically provide a memory address of each motion vector referenced in an interframe prediction process. This address calculator eliminates the need for duplicating a calculated motion vector in multiple storage locations in the memory to allow for the use of the minimum block size. The proposed interframe prediction processor thus reduces the processing time of motion vector calculation. The present invention can be used to increase the processing speed of video coding and decoding devices, taking advantage of its fast motion compensation.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An interframe prediction processor that performs interframe prediction of video frames on a block basis, comprising:
    a reference picture memory providing vector storage locations corresponding to minimum size blocks to store motion vectors calculated for blocks of variable sizes;
    an address calculator that calculates an address of a vector storage location in the reference picture memory, based at least on the size of a specified block;
    a predictor calculator that specifies blocks adjacent to a current block to the address calculator so as to obtain therefrom addresses of motion vectors calculated for the adjacent blocks specified, reads out the motion vectors from the obtained addresses of the reference picture memory, and determines a motion vector predictor of the current block based on the motion vectors read out of the reference picture memory; and
    a reference picture storage manager that writes the calculated motion vectors in the vector storage locations reserved in the reference picture memory;
    wherein the address calculator determines the address of the vector storage location, based on the block size of the specified adjacent block, when an address request specifying an adjacent block is received from the predictor calculator;
    and wherein the address calculator comprises a translation table that associates each combination of block size and block location with a specific address of the reference picture memory; and the address calculator uses the translation table to determine the address of a motion vector in the reference picture memory, based on the block size and block location of the specified block.

2. The interframe prediction processor according to claim 1, wherein:
    the vector storage locations in the reference picture memory include current-block vector storage locations for storing motion vectors of blocks within the current block and adjacent-block vector storage locations for storing motion vectors of blocks adjacent to the current block; and
    the reference picture storage manager copies the calculated motion vector from the current-block vector storage locations to the adjacent-block vector storage locations before a block located next to the current block is selected as a new current block.

3. The interframe prediction processor according to claim 2, wherein the address calculator comprises:

a first translation table associating each combination of the block size and block location with an address of one of the current-block vector storage locations, and a second translation table associating each combination of the block size and block location with an address of one of the adjacent-block vector storage locations, and wherein the address calculator uses the first and second translation tables to determine the address of a vector storage location corresponding to the specified block.

4. A method of performing interframe prediction of video frames on a block basis, comprising the steps of:

providing vector storage locations corresponding to minimum size blocks to store motion vectors calculated for blocks of variable sizes;

specifying blocks adjacent to a current block;

calculating addresses of vector storage locations corresponding to the specified adjacent blocks, based at least on the size of each of the specified adjacent blocks;

reading out motion vectors from the calculated addresses;

determining a motion vector predictor of the current block based on the motion vectors that are read out;

writing a calculated motion vector in the vector storage locations;

determining the addresses of the vector storage locations, based on the block size of the specified adjacent block, when an address request specifying an adjacent block is received;

associating, in a translation table, each combination of block size and block location with a specific address of the reference picture memory; and determining the address of a motion vector in the reference picture memory, based on the block size and block location of the specified block in the translation table.

5. A video coding device that encodes video frames into compressed video data by performing motion-compensated prediction between a source picture and a reference picture on a block basis, comprising:

a reference picture memory providing vector storage locations corresponding to minimum size blocks to store motion vectors calculated for blocks of variable sizes;

an address calculator that calculates an address of a vector storage location in the reference picture memory, based at least on the size of a specified block;

a predictor calculator that specifies blocks adjacent to a current block to the address calculator so as to obtain therefrom addresses of motion vectors calculated for the adjacent blocks specified, reads out the motion vectors from the obtained addresses of the reference picture memory, and determines a motion vector predictor of the current block based on the motion vectors read out of the reference picture memory; and a reference picture storage manager that writes a calculated motion vector in the vector storage locations reserved in the reference picture memory;

wherein the address calculator determines the address of the vector storage location, based on the block size of the specified adjacent block, when an address request specifying an adjacent block is received from the predictor calculator;

and wherein the address calculator comprises a translation table that associates each combination of block size and block location with a specific address of the reference picture memory; and the address calculator uses the translation table to determine the address of a motion vector in the reference picture memory, based on the block size and block location of the specified block.

6. A video decoding device that reconstructs original video frames from a compressed video signal that has been produced by performing motion-compensated interframe prediction on a block basis, comprising:

a reference picture memory providing vector storage locations corresponding to minimum size blocks to store motion vectors calculated for blocks of variable sizes;

an address calculator that calculates an address of a vector storage location in the reference picture memory, based at least on the size of a specified block;

a predictor calculator that specifies blocks adjacent to a current block to the address calculator so as to obtain therefrom addresses of motion vectors calculated for the adjacent blocks specified, reads out the motion vectors from the obtained addresses of the reference picture memory, determines a motion vector predictor of the current block based on the motion vectors read out of the reference picture memory, and reconstructs a motion vector of the current block from the determined motion vector predictor and a decoded motion vector difference; and a reference picture storage manager that writes the reconstructed motion vector in the vector storage locations reserved in the reference picture memory;

wherein the address calculator determines the address of the vector storage location, based on the block size of the specified adjacent block, when an address request specifying an adjacent block is received from the predictor calculator;

and wherein the address calculator comprises a translation table that associates each combination of block size and block location with a specific address of the reference picture memory; and the address calculator uses the translation table to determine the address of a motion vector in the reference picture memory, based on the block size and block location of the specified block.

* * * * *